(12) United States Patent
Liu et al.

(10) Patent No.: US 11,272,525 B2
(45) Date of Patent: Mar. 8, 2022

(54) RESOURCE LOCATION DETERMINING METHOD AND APPARATUS, AND RESOURCE DETERMINING METHOD AND APPARATUS

(71) Applicant: Huawei Technologies Co., Ltd., Shenzhen (CN)

(72) Inventors: Yun Liu, Shenzhen (CN); Jian Wang, Beijing (CN); Da Wang, Shenzhen (CN); Yifan Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 16/644,879

(22) PCT Filed: May 16, 2018

(86) PCT No.: PCT/CN2018/087152
§ 371 (c)(1),
(2) Date: Mar. 5, 2020

(87) PCT Pub. No.: WO2019/047555
PCT Pub. Date: Mar. 14, 2019

(65) Prior Publication Data
US 2020/0288487 A1   Sep. 10, 2020

(30) Foreign Application Priority Data

Sep. 8, 2017 (CN) .......................... 201710808046.X

(51) Int. Cl.
*H04W 72/12* (2009.01)
*H04B 1/713* (2011.01)
(Continued)

(52) U.S. Cl.
CPC ........ *H04W 72/1268* (2013.01); *H04B 1/713* (2013.01); *H04L 5/001* (2013.01);
(Continued)

(58) Field of Classification Search
CPC ......... H04W 72/1268; H04W 72/0413; H04W 72/042; H04W 72/0446; H04L 5/001; H04L 5/0053; H04B 1/713
(Continued)

(56) References Cited

U.S. PATENT DOCUMENTS

2010/0075686 A1   3/2010   Bhattad et al.
2013/0100866 A1   4/2013   Yang et al.
(Continued)

FOREIGN PATENT DOCUMENTS

CN   104703284 A   6/2015
CN   105490784 A   4/2016
(Continued)

OTHER PUBLICATIONS

LG Electronics, "Design of long NR-PUCCH for up to 2 UCI bits," R1-1713177, 3GPP TSG RAN WG1 Meeting #90, Prague, Czech Republic, Aug. 21-25, 2017, 7 pages.
NTT Docomo, Inc., "Scheduling request design in NR system," R1-1713951, 3GPP TSG RAN WG1 Meeting #90, Prague, Czechia, Aug. 21-25, 2017, 3 pages.
Intel Corporation, "Structure of 1-2 bits HARQ-ACK long PUCCH with TDM DMRS," R1-1710553, 3GPP TSG RAN NG1 NR Ad-Hoc#2, Qingdao, P.R. China Jun. 27-30, 2017, 7 pages.
(Continued)

*Primary Examiner* — Peter G Solinsky
(74) *Attorney, Agent, or Firm* — Conley Rose, P.C.

(57) ABSTRACT

This application discloses a resource location determining method and apparatus, and a resource determining method and apparatus, which are used by a terminal in 5G NR to determine an SR resource location. The resource location determining method includes: receiving, by the terminal, SR resource indication information from a base station, where the SR resource indication information is used to indicate an SR resource; and determining, by the terminal, an SR resource location on a first time domain resource based on the SR resource indication information and information about an OCC multiplexing multiple of the first time domain resource, where the SR resource includes a code domain resource and a frequency domain resource.

20 Claims, 8 Drawing Sheets

(51) Int. Cl.
*H04L 5/00* (2006.01)
*H04W 72/04* (2009.01)

(52) U.S. Cl.
CPC ......... *H04L 5/0053* (2013.01); *H04W 72/042* (2013.01); *H04W 72/0413* (2013.01); *H04W 72/0446* (2013.01)

(58) Field of Classification Search
USPC ........................................................ 370/329
See application file for complete search history.

(56) References Cited

U.S. PATENT DOCUMENTS

| | | |
|---|---|---|
| 2014/0198764 A1 | 7/2014 | Han et al. |
| 2016/0366687 A1 | 12/2016 | Guo et al. |
| 2017/0339716 A1* | 11/2017 | Moosavi ............... H04W 72/14 |
| 2018/0092118 A1 | 3/2018 | Kim et al. |
| 2018/0124815 A1* | 5/2018 | Papasakellariou .... H04L 1/1861 |

FOREIGN PATENT DOCUMENTS

| | | |
|---|---|---|
| CN | 106559841 A | 4/2017 |
| KR | 20110063834 A | 6/2011 |
| KR | 20160146553 A | 12/2016 |
| WO | 2016186401 A1 | 11/2016 |
| WO | 2017048162 A1 | 3/2017 |
| WO | 2017127015 A1 | 7/2017 |

OTHER PUBLICATIONS

Nokia et al., "Long PUCCH formats for small payloads," 3GPP TSG RAN WG1#89, R1-1708513, Hangzhou, P.R. China, May 15-19, 2017, 4 pages.

3GPP TS 38.213 V1.0.0, Sep. 2017, "3rd Generation Partnership Project; Technical Specification Group Radio Access Network; NR; Physical layer procedures for control (Release 15)," Sep. 7, 2017, 16 pages.

3GPP TS 38.211, V0.2.0, Aug. 2017, "3rd Generation Partnership Project; Technical Specification Group Radio Access Network; NR; Physical channels and modulation (Release 15)," 30 pages.

3GPP TS 38.331 V0.0.5, Aug. 2017 "3rd Generation Partnership Project; Technical Specification Group Radio Access Network; NR; Radio Resource Control (RRC); Protocol specification (Release 15)," 38 pages.

R1-1719924, LG Electronics, "Remaining aspects of long PUCCH for UCI of up to 2 bits," 3GPP TSG RAN WG1 Meeting 91, Reno, USA, Nov. 27-Dec. 1, 2017, 6 pages.

R1-1712857, VIVO, "Discussion on long-PUCCH for UCI of up to 2 bits," 3GPP TSG RAN WG1 90 Meeting, Prague, P.R. Czechia, Aug. 21-25, 2017, 7 pages.

Ericsson, "Summary of the E-mail Discussion [89-21]: On Long PUCCH for NR," TSG-RAN WG1 NR AH Meeting#2, R1-1711677, Qingdao, China, Jun. 27-30, 2017, 25 pages.

R1-1710085, CATT, et al, "Long PUCCH for small UCI payloads," 3GPP TSG RAN WG1 NR Ad-Hoc#2, Qingdao, P. R. China, Jun. 27-30, 2017, 4 pages.

* cited by examiner

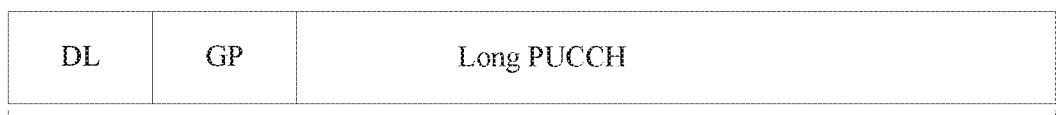
Slot
FIG. 1(a)
Slot
FIG. 1(b)
Slot
FIG. 1(c)
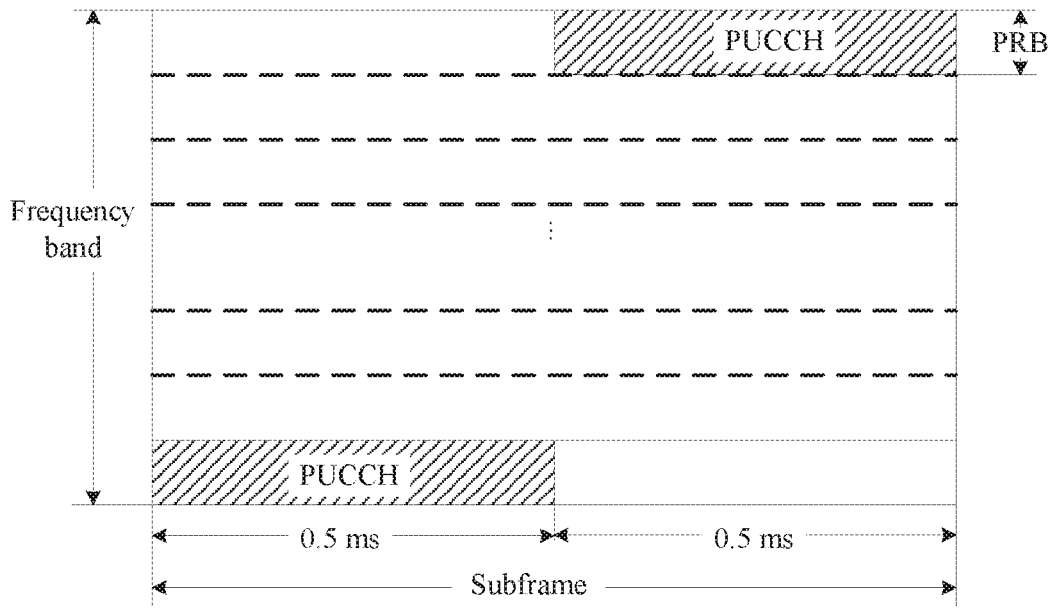
FIG. 2

RESOURCE LOCATION DETERMINING METHOD AND APPARATUS, AND RESOURCE DETERMINING METHOD AND APPARATUS

CROSS-REFERENCE TO RELATED APPLICATIONS

This application is a National Stage of International Patent Application No. PCT/CN2018/087152 filed on May 16, 2018, which claims priority to Chinese Patent Application No. 201710808046.X filed on Sep. 8, 2017. Both of the aforementioned applications are hereby incorporated by reference in their entireties.

TECHNICAL FIELD

This application relates to the field of communications technologies, and in particular, to a resource location determining method and apparatus and a resource determining method and apparatus.

BACKGROUND

During discussion of a 5th generation (fifth-generation, 5G for short) wireless communications technology, there are currently two research directions in the 3rd generation partnership project (3rd generation partnership project, 3GPP for short) organization: a research direction with consideration of backward compatibility and a research direction without consideration of backward compatibility. The research direction without consideration of backward compatibility is referred to as 5G new radio (new radio, NR for short). Currently, there is no SR resource location determining solution in 5G NR.

SUMMARY

The embodiments of this application provide a resource location determining method and apparatus, and a resource determining method and apparatus, which are used by a terminal in 5G NR to determine an SR resource location.

To achieve the foregoing objective, the following technical solutions are provided in the embodiments of this application.

According to a first aspect, a resource location determining method is provided, and the method includes: receiving, by a terminal, SR resource indication information from a base station, where the SR resource indication information is used to indicate an SR resource and determining, by the terminal, an SR resource location on a first time domain resource based on the SR resource indication information and information about an OCC multiplexing multiple of the first time domain resource, where the SR resource includes a code domain resource and a frequency domain resource. According to the first aspect, an SR resource location determining method for a terminal is provided. The method may be used in 5G NR to determine an SR resource location for the terminal. Therefore, an SR resource location determining method is provided for a terminal in 5G NR.

In a possible design, the OCC multiplexing multiple of the first time domain resource is determined based on at least one of information indicating whether a first duration PUCCH on the first time domain resource is transmitted through frequency hopping on the first time domain resource and a quantity of symbols occupied by the first duration PUCCH on the first time domain resource, and the first duration PUCCH carries an SR. In this possible design, a method for determining an OCC multiplexing multiple of a time domain resource is provided. If first duration PUCCHs on different time domain resources are all transmitted through frequency hopping or without frequency hopping on the different time domain resources, when quantities of symbols occupied by the first duration PUCCHs on the different time domain resources are different, OCC multiplexing multiples of the different time domain resources may be different.

In a possible design, when the first duration PUCCH on the first time domain resource is transmitted through frequency hopping on the first time domain resource, $$c = \left\lfloor \frac{L_{PUCCH}}{4} \right\rfloor;$$

or when the first duration PUCCH on the first time domain resource is transmitted without frequency hopping on the first time domain resource, $$c = \left\lfloor \frac{L_{PUCCH}}{2} \right\rfloor,$$

where c is the OCC multiplexing multiple of the first time domain resource and $L_{PUCCH}$ is the quantity of symbols occupied by the first duration PUCCH on the first time domain resource.

In this possible design, a specific method for determining an OCC multiplexing multiple of a time domain resource is provided. If first duration PUCCHs on different time domain resources are all transmitted through frequency hopping or without frequency hopping on the different time domain resources, when quantities of symbols occupied by the first duration PUCCHs on the different time domain resources are different, OCC multiplexing multiples of the different time domain resources may be different.

In a possible design, locations of frequency domain resources in SR resources on different time domain resources are different when OCC multiplexing multiples of the different time domain resources are different.

In a possible design, DMRS symbols on different time domain resources use different OCCs when OCC multiplexing multiples of the different time domain resources are different.

In a possible design, OCC lengths used for UCI symbols on two different time domain resources are 2 and 3 or are 2 and 4 when OCC multiplexing multiples of the two different time domain resources are different.

In a possible design, a quantity of symbols occupied by a first duration PUCCH in a slot, on the first time domain resource, in which an SR resource is configured is greater than or equal to a first preset value.

It should be noted that the terminal may send an SR in a plurality of slots at a same location in a plurality of periods. Because quantities of symbols occupied by first duration PUCCHs in the plurality of slots may be different, the base station needs to schedule a terminal based on a minimum quantity of symbols. If the minimum quantity of symbols is 4, when the first duration PUCCH is transmitted through frequency hopping, c=1, and therefore the base station can schedule only one terminal in the plurality of slots, severely limiting a network capacity. In this possible design, a quantity of symbols occupied by a first duration PUCCH in one slot is set to be greater than or equal to the first preset value, and when the first preset value is used in calculation of c, c is usually greater than or equal to 2. In this case, the base station can schedule at least two terminals in the plurality of slots, greatly increasing a network capacity.

In a possible design, a larger quantity of symbols occupied by the first duration PUCCH on the first time domain resource indicates a smaller quantity of PRBs on the first time domain resource that are used to transmit an SR; or a larger quantity of symbols occupied by the first duration PUCCH on the first time domain resource indicates a larger shift interval between sequences; or when the quantity of symbols occupied by the first duration PUCCH on the first time domain resource is greater than or equal to a second preset value, the first duration PUCCH on the first time domain resource is transmitted through frequency hopping on the first time domain resource; or when the quantity of symbols occupied by the first duration PUCCH on the first time domain resource is less than a second preset value, the first duration PUCCH on the first time domain resource is transmitted without frequency hopping on the first time domain resource. In this possible design, different time domain resources may carry same or similar SR resources, therefore, a problem in which different quantities of symbols occupied by first duration PUCCHs on the different time domain resources result in different capacities of the different time domain resources can be resolved, so as to reduce a resource conflict.

In a possible design, an OCC length is 6 or 7. In this possible design, because the OCC multiplexing multiple is increased, more terminals can be supported in a network system to transmit an SR.

In a possible design, SR resource indication information varies on different time domain resources.

According to a second aspect, a resource determining method is provided, and the method includes: receiving, by a terminal, SR resource indication information from a base station, where the SR resource indication information is used to indicate an SR resource; determining, by the terminal, based on the SR resource indication information, whether an SR resource exists on a first time domain resource. According to the method provided in the second aspect, after receiving the SR resource indication information sent by the base station, the terminal may determine, based on the SR resource indication information, whether an SR resource exists on the first time domain resource, so as to determine whether to transmit an SR on the first time domain resource. A resource conflict does not occur even if different quantities of symbols occupied by first duration PUCCHs result in different capacities of different slots.

In a possible design, the first time domain resource includes one slot, and the determining, by the terminal, based on the SR resource indication information, whether an SR resource exists on a first time domain resource includes: obtaining, by the terminal, a quantity of SR resources on the first time domain resource; and determining, by the terminal, based on the SR resource indication information and the quantity of SR resources on the first time domain resource, whether an SR resource exists on the first time domain resource.

In a possible design, the SR resource indication information is an SR resource number, and the quantity of SR resources is used to determine an SR resource number upper-bound. When the SR resource number is less than or equal to an SR resource number upper-bound of the first time domain resource, an SR resource exists on the first time domain resource; otherwise, no SR resource exists on the first time domain resource.

In a possible design, the quantity of SR resources on the first time domain resource is configured by the base station; or the quantity of SR resources on the first time domain resource is calculated by the terminal based on a range of PRBs on the first time domain resource that are capable of transmitting an SR or based on a quantity of all PRBs on the first time domain resource.

In a possible design, the first time domain resource includes m slots, and in is an integer greater than or equal to 2. The determining, by the terminal, based on the SR resource indication information, whether an SR resource exists on a first time domain resource includes: obtaining, by the terminal, a quantity of SR resources in the m slots; and determining, by the terminal, based on the SR resource indication information and the quantity of SR resources in the m slots, whether an SR resource exists on the first time domain resource.

In a possible design, the SR resource indication information is an SR resource number, and a quantity of SR resources is used to determine an SR resource number upper-bound. When the SR resource number is between a first value and a second value, an SR resource for the terminal is located on a first duration PUCCH in an $(n+1)^{th}$ slot in them slots; otherwise, no SR resource for the terminal exists in the m slots. The first value is a sum of SR resource number upper-bounds of first n slots in the m slots, and the second value is a sum of SR resource number upper-bounds of first (n+1) slots in the m slots.

In a possible design, the SR resource indication information is an SR resource number, and a quantity of SR resources is used to determine an SR resource number upper-bound. When the SR resource number is less than or equal to an SR resource number upper-bound of a first slot in the m slots, an SR resource for the terminal is located on a first duration PUCCH in at least two slots including the first slot, and the first slot is a slot with a smallest SR resource number upper-bound in the m slots.

In a possible design, the SR resource indication information is an SR resource number, and a quantity of SR resources is used to determine an SR resource number upper-bound. When the SR resource number is less than or equal to a first SR resource number upper-bound, an SR resource for the terminal is located on the first duration PUCCH on the first time domain resource; otherwise, the terminal has no SR resource on the first time domain resource. The first SR resource number upper-bound is an SR resource number upper-bound calculated by the terminal based on a total number of symbols occupied by the first duration PUCCH on the first time domain resource.

In a possible design, SR resource indication information varies on different time domain resources. It should be noted that, for a terminal to which a smaller SR resource number is allocated, a probability of occurrence of an SR resource is far higher than that for a terminal to which a larger SR resource number is allocated. As a result, uneven resources are allocated between terminals. In this possible design, an SR resource number of a terminal is changed at regular intervals, and this can balance the resource allocation.

In a possible design, when the terminal determines that no SR resource exists on the first time domain resource, an SR count increases by 1, and when the SR count reaches an upper bound, the terminal re-initiates random access.

In a possible design, a quantity of symbols occupied by a first duration PUCCH in a slot, on the first time domain resource, in which an SR resource is configured is greater than or equal to a first preset value. It should be noted that the terminal may send an SR in a plurality of slots at a same location in a plurality of periods. Because quantities of symbols occupied by first duration PUCCHs in the plurality of slots may be different, the base station needs to schedule a terminal based on a minimum quantity of symbols. If the minimum quantity of symbols is 4, when the first duration PUCCH is transmitted through frequency hopping, c=1, and therefore the base station can schedule only one terminal in the plurality of slots, severely limiting a network capacity. In this possible design, a quantity of symbols occupied by a first duration PUCCH in one slot is set to be greater than or equal to the first preset value, and when the first preset value is used in calculation of c, c is usually greater than or equal to 2. In this case, the base station can schedule at least two terminals in the plurality of slots, greatly increasing a network capacity.

According to a third aspect, a resource location determining method is provided, and the method includes: sending, by a base station to a terminal, at least one of a frequency hopping indication and a quantity of symbols occupied by a first duration PUCCH on a first time domain resource, where the frequency hopping indication is used to indicate whether the first duration PUCCH on the first time domain resource is transmitted through frequency hopping on the first time domain resource; and sending, by the base station SR resource indication information to the terminal, so that the terminal determines an SR resource location on the first time domain resource based on the SR resource indication information and at least one of the frequency hopping indication and the quantity of symbols occupied by the first duration PUCCH on the first time domain resource. According to the third aspect, an SR resource location determining method for a terminal is provided. The method may be used in 5G NR to determine an SR resource location for a terminal. Therefore, an SR resource location determining method is provided for a terminal in 5G NR.

In a possible design, at least one of the frequency hopping indication and the quantity of symbols occupied by the first duration PUCCH on the first time domain resource is used to calculate an OCC multiplexing multiple of the first time domain resource, and the first duration PUCCH carries an SR. In this possible design, a method for determining an OCC multiplexing multiple of a time domain resource is provided. If first duration PUCCHs on different time domain resources are all transmitted through frequency hopping or without frequency hopping on the different time domain resources, when quantities of symbols occupied by the first duration PUCCHs on the different time domain resources are different, OCC multiplexing multiples of the different time domain resources may be different.

In a possible design, when the first duration PUCCH on the first time domain resource is transmitted through frequency hopping on the first time domain resource, $$c = \left\lfloor \frac{L_{PUCCH}}{4} \right\rfloor;$$

or when the first duration PUCCH on the first time domain resource is transmitted without frequency hopping on the first time domain resource, $$c = \left\lfloor \frac{L_{PUCCH}}{2} \right\rfloor,$$

where c is the OCC multiplexing multiple of the first time domain resource and $L_{PUCCH}$ is the quantity of symbols occupied by the first duration PUCCH on the first time domain resource. In this possible design, a specific method for determining an OCC multiplexing multiple of a time domain resource is provided. If first duration PUCCHs on different time domain resources are all transmitted through frequency hopping or without frequency hopping on the different time domain resources, when quantities of symbols occupied by the first duration PUCCHs on the different time domain resources are different, OCC multiplexing multiples of the different time domain resources may be different.

In a possible design, locations of frequency domain resources in SR resources on different time domain resources are different when OCC multiplexing multiples of the different time domain resources are different.

In a possible design, DMRS symbols on different time domain resources use different OCCs when OCC multiplexing multiples of the different time domain resources are different.

In a possible design, OCC lengths used for UCI symbols on two different time domain resources are 2 and 3 or are 2 and 4 when OCC multiplexing multiples of the two different time domain resources are different.

In a possible design, an OCC length is 6 or 7. In this possible design, because the OCC multiplexing multiple is increased, more terminals can be supported in a network system to transmit an SR.

In a possible design, the method further includes: sending, by the base station, first configuration information to the terminal. The first configuration information includes at least one type of the following information: a range that is configured by the base station for the terminal and that is of PRBs on the first time domain resource that are used to transmit an SR, and a shift interval that is between sequences on the first time domain resource and that is configured by the base station for the terminal. A larger quantity of symbols occupied by the first duration PUCCH on the first time domain resource indicates a smaller range of PRBs on the first time domain resource that are used to transmit an SR, and a larger quantity of symbols occupied by the first duration PUCCH on the first time domain resource indicates a larger shift interval between the sequences. In this possible design, different time domain resources may carry same or similar SR resources, therefore, a problem in which different quantities of symbols occupied by first duration PUCCHs on the different time domain resources result in different capacities of the different time domain resources can be resolved, so as to reduce a resource conflict.

In a possible design, a quantity of symbols occupied by a first duration PUCCH in a slot, on the first time domain resource, in which an SR resource is configured is greater than or equal to a first preset value. It should be noted that the terminal may send an SR in a plurality of slots at a same location in a plurality of periods. Because quantities of symbols occupied by first duration PUCCHs in the plurality of slots may be different, the base station needs to schedule a terminal based on a minimum quantity of symbols. If the minimum quantity of symbols is 4, when the first duration PUCCH is transmitted through frequency hopping, c=1, and therefore the base station can schedule only one terminal in the plurality of slots, severely limiting a network capacity. In this possible design, a quantity of symbols occupied by a first duration PUCCH in one slot is set to be greater than or equal to the first preset value, and when the first preset value is used in calculation of c, c is usually greater than or equal to 2. In this case, the base station can schedule at least two terminals in the plurality of slots, greatly increasing a network capacity.

In a possible design, when the quantity of symbols occupied by the first duration PUCCH on the first time domain resource is greater than or equal to a second preset value, the first duration PUCCH on the first time domain resource is transmitted by the terminal through frequency hopping on the first time domain resource, or when the quantity of symbols occupied by the first duration PUCCH on the first time domain resource is less than a second preset value, the first duration PUCCH on the first time domain resource is transmitted by the terminal without frequency hopping on the first time domain resource. In this possible design, different time domain resources may carry same or similar SR resources, therefore, a problem in which different quantities of symbols occupied by first duration PUCCHs on the different time domain resources result in different capacities of the different time domain resources can be resolved, so as to reduce a resource conflict.

In a possible design, SR resource indication information varies on different time domain resources.

According to a fourth aspect, a resource determining method is provided, and the method includes: sending, by a base station, first information to a terminal, where the first information includes at least one of a quantity of SR resources on a first time domain resource, a range of PRBs on the first time domain resource that are capable of transmitting an SR, and a quantity of all PRBs on the first time domain resource; and sending, by the base station, SR resource indication information to the terminal, so that the terminal determines, based on the SR resource indication information and the first information, whether an SR resource exists on the first time domain resource.

According to the method provided in the fourth aspect, the base station may send the SR resource indication information to the terminal; and after receiving the SR resource indication information sent by the base station, the terminal may determine, based on the SR resource indication information, whether an SR resource exists on the first time domain resource, so as to determine whether to transmit an SR on the first time domain resource. A resource conflict does not occur even if different quantities of symbols occupied by first duration PUCCHs result in different capacities of different slots.

In a possible design, a larger quantity of symbols occupied by a first duration PUCCH on the first time domain resource indicates a smaller range of PRBs on the first time domain resource that are capable of transmitting an SR. In this possible design, on a time domain resource with a larger quantity of symbols occupied by a first duration PUCCH, more frequency domain resources may be allocated to transmit other information.

In a possible design, the method further includes: sending, by the base station, second configuration information to the terminal. The second configuration information includes at least one type of the following information: a shift interval that is between sequences on the first time domain resource and that is configured by the base station for the terminal, and an indication configured by the base station for the terminal for indicating whether the first duration PUCCH on the first time domain resource is transmitted through frequency hopping on the first time domain resource. A larger quantity of symbols occupied by the first duration PUCCH on the first time domain resource indicates a larger shift interval between the sequences. When the quantity of symbols occupied by the first duration PUCCH on the first time domain resource is greater than or equal to a second preset value, the first duration PUCCH on the first time domain resource is transmitted through frequency hopping on the first time domain resource. When the quantity of symbols occupied by the first duration PUCCH on the first time domain resource is less than a second preset value, the first duration PUCCH on the first time domain resource is transmitted without frequency hopping on the first time domain resource. In this possible design, different time domain resources may carry same or similar SR resources, therefore, a problem in which different quantities of symbols occupied by first duration PUCCHs on the different time domain resources result in different capacities of the different time domain resources can be resolved, so as to reduce a resource conflict.

In a possible design, a quantity of symbols occupied by a first duration PUCCH in a slot, on the first time domain resource, in which an SR resource is configured is greater than or equal to a first preset value. It should be noted that the terminal may send an SR in a plurality of slots at a same location in a plurality of periods. Because quantities of symbols occupied by first duration PUCCHs in the plurality of slots may be different, the base station needs to schedule a terminal based on a minimum quantity of symbols. If the minimum quantity of symbols is 4, when the first duration PUCCH is transmitted through frequency hopping, c=1, and therefore the base station can schedule only one terminal in the plurality of slots, severely limiting a network capacity. In this possible design, a quantity of symbols occupied by a first duration PUCCH in one slot is set to be greater than or equal to the first preset value, and when the first preset value is used in calculation of c, c is usually greater than or equal to 2. In this case, the base station can schedule at least two terminals in the plurality of slots, greatly increasing a network capacity.

In a possible design, SR resource indication information varies on different time domain resources. It should be noted that, for a terminal to which a smaller SR resource number is allocated, a probability of occurrence of an SR resource is far higher than that for a terminal to which a larger SR resource number is allocated. As a result, uneven resources are allocated between terminals. In this possible design, an SR resource number of a terminal is changed at regular intervals, and this can balance the resource allocation.

According to a fifth aspect, a resource location determining apparatus is provided, and the apparatus has a function of implementing any method provided in the first aspect. The function may be implemented by using hardware, or may be implemented by hardware executing corresponding software. The hardware or the software includes one or more units corresponding to the foregoing function.

According to a sixth aspect, a resource determining apparatus is provided, and the apparatus has a function of implementing any method provided in the second aspect. The function may be implemented by using hardware, or may be implemented by hardware executing corresponding software. The hardware or the software includes one or more units corresponding to the foregoing function.

According to a seventh aspect, a resource location determining apparatus is provided, and the apparatus has a function of implementing any method provided in the third aspect. The function may be implemented by using hardware, or may be implemented by hardware executing corresponding software. The hardware or the software includes one or more units corresponding to the foregoing function.

According to an eighth aspect, a resource determining apparatus is provided, and the apparatus has a function of implementing any method provided in the fourth aspect. The function may be implemented by using hardware, or may be implemented by hardware executing corresponding software. The hardware or the software includes one or more units corresponding to the foregoing function.

According to a ninth aspect, a resource location determining apparatus is provided. The apparatus includes a memory and a processor. The memory is configured to store a computer executable instruction, and the processor executes the computer executable instruction stored in the memory, so that the apparatus implements any method provided in the first aspect. The apparatus may exist in a product form of a chip.

According to a tenth aspect, a resource determining apparatus is provided. The apparatus includes a memory and a processor. The memory is configured to store a computer executable instruction, and the processor executes the computer executable instruction stored in the memory, so that the apparatus implements any method provided in the second aspect. The apparatus may exist in a product form of a chip.

According to an eleventh aspect, a resource location determining apparatus is provided. The apparatus includes a memory and a processor. The memory is configured to store a computer executable instruction, and the processor executes the computer executable instruction stored in the memory, so that the apparatus implements any method provided in the third aspect. The apparatus may exist in a product form of a chip.

According to a twelfth aspect, a resource determining apparatus is provided. The apparatus includes a memory and a processor. The memory is configured to store a computer executable instruction, and the processor executes the computer executable instruction stored in the memory, so that the apparatus implements any method provided in the fourth aspect. The apparatus may exist in a product form of a chip.

According to a thirteenth aspect, a computer-readable storage medium is provided, including an instruction. When the instruction runs on a computer, the computer performs any method provided in the first aspect or the second aspect.

According to a fourteenth aspect, a computer-readable storage medium is provided, including an instruction. When the instruction runs on a computer, the computer performs any method provided in the third aspect or the fourth aspect.

According to a fifteenth aspect, a computer program product that includes an instruction is provided. When the instruction runs on a computer, the computer performs any method provided in the first aspect or the second aspect.

According to a sixteenth aspect, a computer program product that includes an instruction is provided. When the instruction runs on a computer, the computer performs any method provided in the third aspect or the fourth aspect.

For a technical effect brought by any design in the fifth aspect to the sixteenth aspect, refer to a technical effect brought by a corresponding design in the first aspect to the fourth aspect. Details are not described again herein.

BRIEF DESCRIPTION OF DRAWINGS

FIG. 1(a) to FIG. 1(c) are a schematic diagram of a time domain resource occupied by a long PUCCH according to an embodiment of this application;

FIG. 2 is a schematic diagram of transmitting a PUCCH through frequency hopping according to an embodiment of this application;

DESCRIPTION OF EMBODIMENTS

Figure 3:
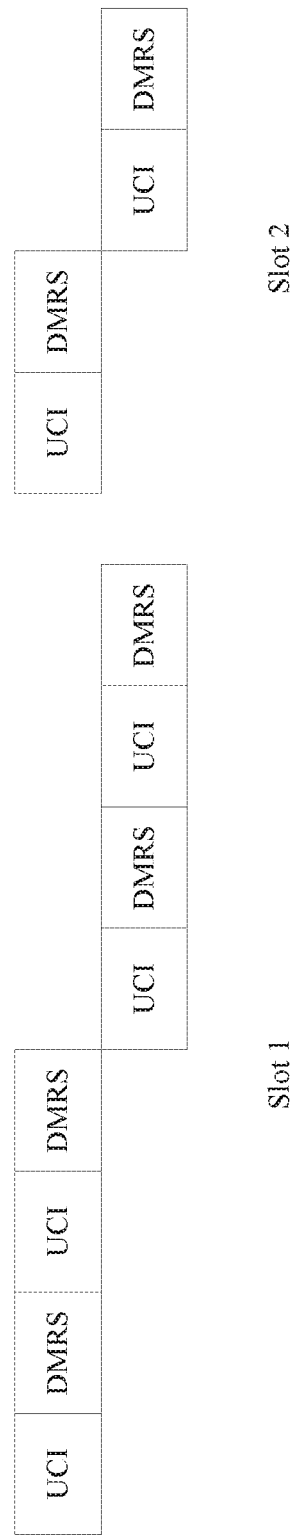
FIG. 3 is a schematic diagram of a signal transmitted on a long PUCCH according to an embodiment of this application.

In a 5G NR discussion process, a time domain resource occupied by a long (long) physical uplink control channel (physical uplink control channel, PUCCH for short) may be shown in three cases FIG. 1(a), FIG. 1(b), and FIG. 1(c). In case FIG. 1(a), all symbols in an entire slot are occupied by a long PUCCH. In case FIG. 1(b), symbols behind a guard period (guard period, GP for short) are occupied by a long PUCCH, and a symbol other than symbols occupied by the GP and the long PUCCH may be used to send downlink (downlink, DL for short) information. In case FIG. 1(c), symbols between a GP and a short (short) PUCCH are occupied by a long PUCCH, and a symbol other than symbols occupied by the long PUCCH, the GP, and the short PUCCH may be used to send DL information. A quantity of symbols in one slot is 14, or certainly may be another value. In 5G NR, a minimum quantity of symbols occupied by the long PUCCH is four, a maximum quantity of symbols occupied by the long PUCCH in one slot is 14, and a quantity of symbols occupied by long PUCCHs in a plurality of slots is uncertain. The long PUCCH described herein is a first duration PUCCH in the following.

The long PUCCH may carry a scheduling request (scheduling request, SR for short). The SR is request signaling sent by a terminal to a base station when the terminal has an uplink transmission requirement, to obtain a time domain resource, a frequency domain resource, and a code domain resource that are used by the terminal to send uplink data. When configuring a resource (hereinafter referred to as an SR resource) used by the terminal to send an SR, the base station only needs to determine a time domain resource, a frequency domain resource, a code domain resource, and a time domain period that are used by the terminal. After configuration is completed, when the terminal has an uplink transmission requirement, the terminal transmits an SR on the corresponding resource, and the base station determines, through energy detection, whether the terminal transmits an SR. When the base station receives the SR from the terminal, the base station sends, to the terminal at proper time, downlink control signaling carrying information about an allocated resource used by the terminal to send uplink data. Then the terminal transmits uplink data on the resource allocated by the base station.

In a long term evolution (long term evolution, LTE for short) system, to improve a hierarchical gain, a PUCCH may be transmitted on a subframe through frequency hopping. As shown in FIG. 2, a subframe of 1 ms is divided into two segments (0.5 ms each) in time domain to transmit the PUCCH, and the PUCCH is transmitted on two sides of a frequency band in frequency domain. Specifically, 1 ms includes 13 (or 14) symbols, first seven symbols are used for transmission on one side of the frequency band, and last six (or seven) symbols are used for transmission on the other side of the frequency band.

Different quantities of symbols occupied by long PUCCHs result in a problem of different capacities of different slots. One slot may have 14 symbols to transmit an SR, and another slot after a period of time may have only four symbols to transmit an SR. Orthogonal cover code (orthogonal cover code, OCC for short) lengths supported by the two slots are 3 and 1 when the long PUCCH is transmitted through frequency hopping, to be specific, quantities of terminals supported by the two slots are different on a same frequency domain resource. If the $s^{th}$ slot in a period may allow x (x is an integer greater than zero) terminals to send SRs, and the $s^{th}$ slot in a next period may allow y (y is an integer greater than zero and less than x) terminals to send SRs, there is no resource for (x-y) terminals to send SRs in the $s^{th}$ slot in the next period. However, the (x-y) terminals still send SRs in the $s^{th}$ slot in the next period, while a time domain resource originally used for the (x-y) terminals to send the SRs has already been used to send other information. Consequently, a resource conflict occurs, In an LTE system, a length of a PUCCH in one subframe is 14 symbols, and 13 symbols are only used in a special case. When a PUCCH is transmitted through frequency hopping, each frequency hopping part includes six or seven symbols, to be specific, each frequency hopping part includes three demodulation reference signals (demodulated reference signal, DMRS for short) and three or four uplink control information (uplink control information, UCI for short) symbols. Therefore, an OCC length in time domain is 3, and a maximum of a threefold quantity of UEs are supported to multiplex a same time and frequency domain resource. In this case, different lengths of PUCCHs in slots do not cause different capacities of different slots.

For example, referring to FIG. 3, if a long PUCCH with a length of eight symbols exists in a slot 1 and the long PUCCH is transmitted through frequency hopping, an OCC length is 2, to be specific, a twofold quantity of terminals are supported to multiplex the long PUCCH, so that a maximum of 24 terminals are supported to multiplex one (physical resource block, PRB for short) in the slot 1. If a long PUCCH with a length of four symbols exists in a slot 2 and the long PUCCH is transmitted through frequency hopping, an OCC length is 1, so that a maximum of 12 terminals are supported to multiplex one PRB in the slot 2. It can be learned that different quantities of symbols occupied by long PUCCHs in different slots cause different capacities of the different slots.

Figure 4:
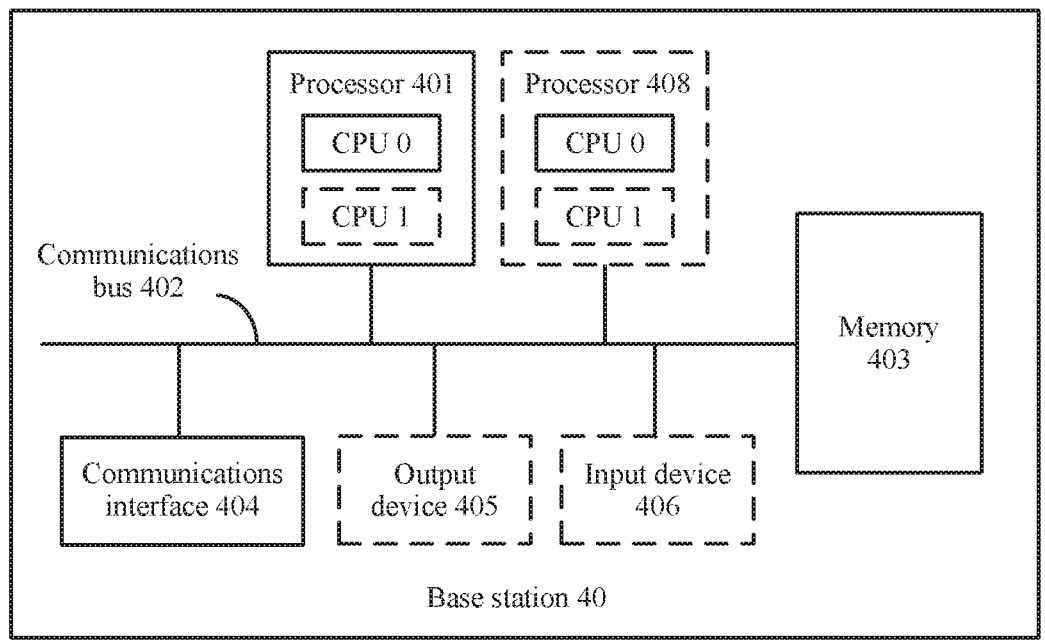
FIG. 4 is a schematic diagram of a hardware structure of a base station according to an embodiment of this application.

FIG. 4 is a schematic structural diagram of hardware of a base station 40 according to an embodiment of this application. The base station 40 includes at least one processor 401, a communications bus 402, a memory 403, and at least one communications interface 404.

The processor 401 may be a general-purpose central processing unit (central processing unit, CPU for short), a microprocessor, an application-specific integrated circuit (application-specific integrated circuit, ASIC for short), or one or more integrated circuits configured to control program execution of the solutions in this application.

The communications bus 402 may include a path used to transmit information between the foregoing components.

The communications interface 404 may be any apparatus such as a transceiver to communicate with another device or a communications network such as the Ethernet, a radio access network (radio access network, RAN for short), or a wireless local area network (wireless area networks, WLAN for short).

The memory 403 may be a read-only memory (read-only memory, ROM for short) or another type of static storage device capable of storing static information and instructions, a random access memory (random access memory, RAM for short) or another type of dynamic storage device capable of storing information and instructions, or may be an electrically erasable programmable read-only memory (electrically erasable programmable read-only memory, EEPROM for short), a compact disc read-only memory (compact disc read-only memory, CD-ROM for short) or other compact disc storage or optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of instructions or data structures and capable of being accessed by a computer, but is not limited thereto. The memory may exist independently and is connected to the processor by using the bus. The memory may also be integrated with the processor.

The memory 403 is configured to store application program code for executing the solutions in this application, and the processor 401 controls the execution. The processor 401 is configured to execute the application program code stored in the memory 403, to perform methods provided in the following embodiments of this application.

During specific implementation, in an embodiment, the processor 401 may include one or more CPUs, for example, a CPU 0 and a CPU 1 in FIG. 4.

During specific implementation, in an embodiment, the base station 40 may include a plurality of processors, for example, the processor 401 and a processor 408 in FIG. 4, Each of these processors may be a single-core (single-CPU) processor, or may be a multi-core (multi-CPU) processor. The processor herein may be one or more devices, circuits, and/or processing cores used to process data (such as a computer program instruction).

During specific implementation, in an embodiment, the base station 40 may further include an output device 405 and an input device 406.

Figure 5:
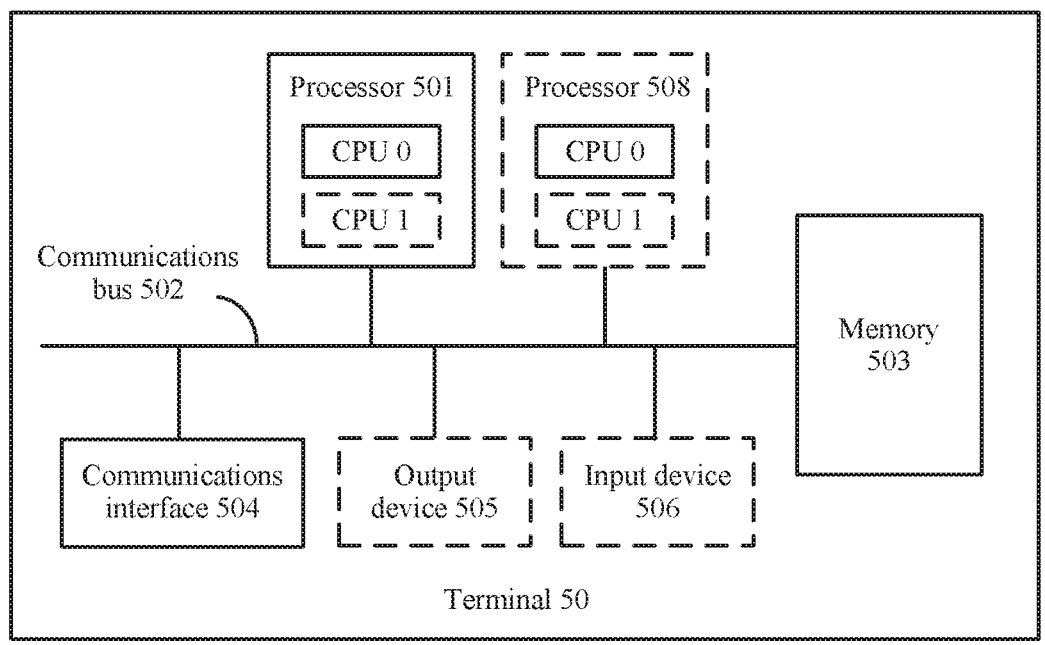
FIG. 5 is a schematic diagram of a hardware structure of a terminal according to an embodiment of this application.

FIG. 5 is a schematic structural diagram of hardware of a terminal 50 according to an embodiment of this application. The terminal 50 includes at least one processor 501, a communications bus 502, a memory 503, and at least one communications interface 504.

During specific implementation, in an embodiment, the processor 501 may include one or more CPUs, for example, a CPU 0 and a CPU 1 in FIG. 5.

During specific implementation, in an embodiment, the terminal 50 may include a plurality of processors such as a processor 501 and a processor 508 in FIG. 5.

During specific implementation, in an embodiment, the terminal 50 may further include an output device 505 and an input device 506. For functions and other descriptions of the components shown in FIG. 5, refer to the foregoing descriptions.

Figure 6:
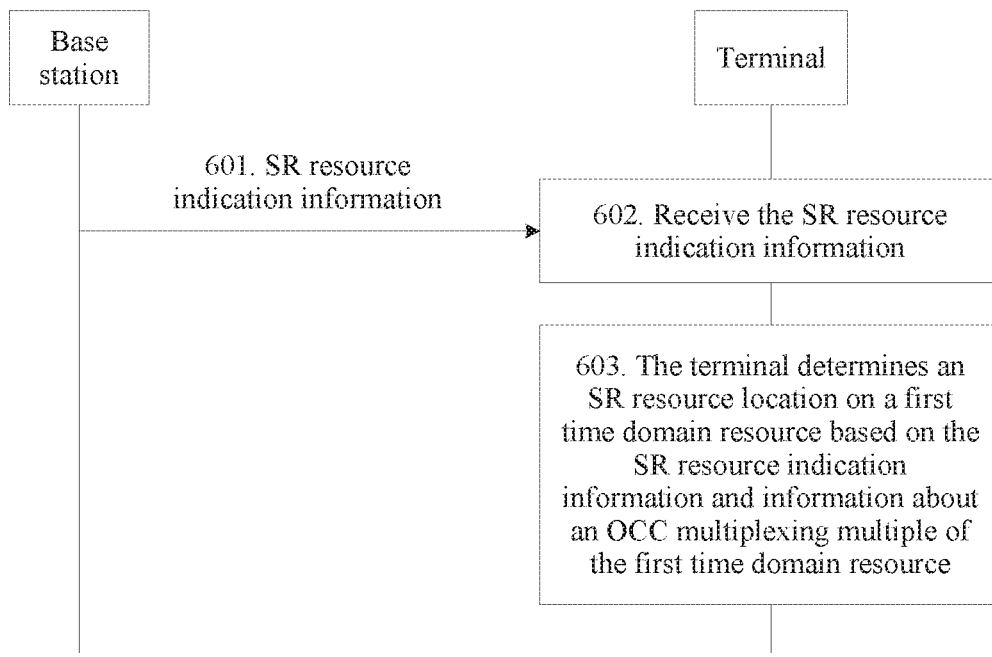
FIG. 6 is a flowchart of a resource location determining method according to an embodiment of this application.

An embodiment of this application provides a resource location determining method. As shown in FIG. 6, the method may include the following steps.

601. A base station sends SR resource indication information to a terminal.

The SR resource indication information is used to indicate an SR resource, and the SR resource indication information may be an SR resource number or other information used to determine the SR resource. Different SR resource numbers correspond to different resources.

Optionally, SR resource indication information varies on different time domain resources.

602. The terminal receives the SR resource indication information from the base station.

603. The terminal determines an SR resource location on a first time domain resource based on the SR resource indication information and information about an OCC multiplexing multiple of the first time domain resource, where the SR resource includes a code domain resource and a frequency domain resource.

For example, the first time domain resource may include one slot or a plurality of slots, and the plurality of slots may be one transmission period of an SR. The information about the OCC multiplexing multiple may be an OCC multiplexing multiple, or may be information used to determine an OCC multiplexing multiple.

This embodiment of this application provides an SR resource location determining method for a terminal. The method may be used in 5G NR to determine an SR resource location for a terminal. Therefore, an SR resource location determining method is provided for a terminal in 5G NR.

Optionally, the OCC multiplexing multiple of the first time domain resource is determined based on at least one of information indicating whether a first duration PUCCH on the first time domain resource is transmitted through frequency hopping on the first time domain resource and a quantity of symbols occupied by the first duration PUCCH on the first time domain resource, and the first duration PUCCH carries an SR. In this optional method, an OCC multiplexing multiple of a time domain resource may be determined. If first duration PUCCHs on different time domain resources are all transmitted through frequency hopping or without frequency hopping on the different time domain resources, when quantities of symbols occupied by the first duration PUCCHs on the different time domain resources are different, OCC multiplexing multiples of the different time domain resources may be different.

Optionally, the base station may configure a plurality of first duration PUCCHs carrying SR resources on one time domain resource, and the plurality of first duration PUCCHs may be located in one slot or a plurality of slots. In this embodiment of this application, a first duration PUCCH carries an SR.

Specifically, the method may further include: sending, by the base station to the terminal, at least one of a frequency hopping indication and a quantity of symbols occupied by the first duration PUCCH on the first time domain resource, where the frequency hopping indication is used to indicate whether the first duration PUCCH on the first time domain resource is transmitted through frequency hopping on the first time domain resource; and receiving, by the terminal from the base station, at least one of the frequency hopping indication and the quantity of symbols occupied by the first duration PUCCH on the first time domain resource, and determining the OCC multiplexing multiple of the first time domain resource based on at least one of the frequency hopping indication and the quantity of symbols occupied by the first duration PUCCH on the first time domain resource.

Specifically, a method used by the terminal to calculate the OCC multiplexing multiple of the first time domain resource is as follows: When the first duration PUCCH on the first time domain resource is transmitted through frequency hopping on the first time domain resource, $$c = \left\lfloor \frac{L_{PUCCH}}{4} \right\rfloor;$$

or when the first duration PUCCH on the first time domain resource is transmitted without frequency hopping on the first time domain resource, $$c = \left\lfloor \frac{L_{PUCCH}}{2} \right\rfloor.$$

In other words, $$c = \begin{cases} \left\lfloor \frac{L_{PUCCH}}{4} \right\rfloor & \text{during transmission throught frequency hopping} \\ \left\lfloor \frac{L_{PUCCH}}{2} \right\rfloor & \text{during transmission without frequency hopping} \end{cases}.$$

For example, if $L_{PUCCH}=8$ for the first time domain resource, when the first duration PUCCH on the first time domain resource is transmitted through frequency hopping, c=2, or when the first duration PUCCH on the first time domain resource is transmitted without frequency hopping, c=4. A symbol length of the first duration PUCCH may be calculated by the terminal by receiving signaling sent by the base station, and the signaling may include any one or more pieces of information such as a start location, an end location, and a subframe configuration number of the first duration PUCCH.

Herein, c is the OCC multiplexing multiple of the first time domain resource and $L_{PUCCH}$ is the quantity of symbols occupied by the first duration PUCCH on the first time domain resource. It may be learned from a method for calculating the OCC multiplexing multiple of the first time domain resource that when different quantities of symbols occupied by first PUCCHs included in two different time domain resources lead to different calculation results of c, multiplexing multiples of the two different time domain resources are different.

Optionally, the base station may configure c for each time domain resource. For example, the base station may configure a same c for each time domain resource. Alternatively, the base station may configure c for each time domain resource, a sum of multiplexing multiples c of every g time domain resources is a fixed value, and the g time domain resources may be one period for transmitting an SR.

For example, when the first time domain resource is one slot, the SR resource may be specifically represented by using three parameters: an OCC number, a frequency domain location, and a cyclic shift (cyclic shift) when step 603 is specifically implemented. A process in which the terminal determines the SR resource location on the first time domain resource based on the SR resource indication information and the OCC multiplexing multiple of the first time domain resource may specifically include the following cases.

(1) A specific method for determining an OCC number of the first time domain resource based on the SR resource indication information and the OCC multiplexing multiple of the first time domain resource includes:

$$n'(n_s) = \begin{cases} n_{PUCCH} \bmod(c \cdot N_{SC}^{RB}/\Delta) & \text{first frequency hopping part} \\ [c(n'(n_s-1))] \\ \bmod(c \cdot N_{SC}^{RB}/\Delta) & \text{second frequency hopping part} \end{cases};$$

and $n_{oc}(n_s) = \lfloor n'(n_s) \cdot \Delta / N_{SC}^{RB} \rfloor$, where $n_{PUCCH}$ is the SR resource number; mod is modulo; c is the OCC multiplexing multiple; $N_{SC}^{RB}$ is a quantity of subcarriers in each PRB and is usually 12; $\Delta$ is a shortest distance of cyclic shifts between sequences in frequency domain, namely, a shift interval between sequences in the following, or may also be referred to as a shift parameter, to be specific, is a shortest distance of cyclic shifts between sequences in frequency domain; $n_s$ is a slot number; $n(n_s)$ is a code domain resource parameter for limiting the SR resource number to one PRB, and the parameter is used to calculate the OCC number; and $n_{OC}$ is the OCC number.

Optionally, DMRS symbols on different time domain resources use different OCCs when OCC multiplexing multiples of the different time domain resources are different.

Specifically, because different values of c result in different calculated OCC numbers on different time domain resources, different DMRS symbols on different time domain resources use different OCCs.

Optionally, OCC lengths used for UCI symbols on two different time domain resources are 2 and 3 or are 2 and 4 when OCC multiplexing multiples of the two different time domain resources are different.

it should be noted that the two different time domain resources may be different slots. The OCC multiplexing multiple may be 1, 2, or 3 when the first duration PUCCH is transmitted through frequency hopping. The OCC length is 2 or 3 when the OCC multiplexing multiple is 2. The OCC length is 3 or 4 when the OCC multiplexing multiple is 3. The OCC lengths used for the UCI symbols in the two slots may be 2 and 3 or may be 2 and 4 when the OCC multiplexing multiples in the two slots are 2 and 3.

(2) A specific method for determining a frequency domain location on the first time domain resource based on the SR resource indication information and the OCC multiplexing multiple of the first time domain resource includes:

$$n_{PRB} = \begin{cases} \left\lfloor \dfrac{\left\lfloor \dfrac{n_{PUCCH}}{c \cdot N_{SC}^{RB}/\Delta} \right\rfloor}{2} \right\rfloor & \text{first frequency hopping part} \\ N_{SC}^{UL} - 1 - \left\lfloor \dfrac{\left\lfloor \dfrac{n_{PUCCH}}{c \cdot N_{SC}^{RB}/\Delta} \right\rfloor}{2} \right\rfloor & \text{second frequency hopping part} \end{cases},$$

where $N_{RB}^{UL}$ is a total bandwidth of an uplink transmission or an uplink bandwidth supported by the terminal; and $n_{PRB}$ is a PRB number. For meanings of other parameters, refer to the foregoing descriptions.

In an LTE system, because c remains unchanged, a frequency domain PRB on which an SR resource is located remains unchanged. In this embodiment of this application, on two different time domain resources, when values of c are different, a frequency domain PRB, on which the SR resource is located, on a time domain resource is different from that on a next time domain resource, to be specific, locations of frequency domain resources in SR resources on different time domain resources are different when OCC multiplexing multiples of the different time domain resources are different.

In addition, it may be teamed from the foregoing method for determining the frequency domain location on the first time domain resource that the frequency domain resource in the SR resource increases when c decreases and m increases.

(3) A specific method for determining a cyclic shift on the first time domain resource based on the SR resource indication information and the OCC multiplexing multiple of the first time domain resource includes:

$$n_{cs}(n_s, l) = [n_{cs}^{cell}(n_s, l) + (n'(n_s) \cdot \Delta + (n_{OC}(n_s) \bmod \Delta)) \bmod N_{SC}^{RB}] \bmod N_{SC}^{RB}, \text{ where}$$

$$\partial_\rho(n_s, l) = 2\pi \cdot n_{cs}(n_s, l)/N_{Sc}^{RB}$$

$n_{cs}^{cell}$ is a cell-level random number sequence; l is a quantity of symbols; $n_{cs}$ is a phase offset of a frequency domain sequence; and $\partial_\rho$ is a phase of the frequency domain sequence. For meanings of other parameters, refer to the foregoing descriptions.

Calculation manners of the foregoing three parameters are mutually independent.

Optionally, a quantity of symbols occupied by a first duration PUCCH in a slot, on the first time domain resource, in which an SR resource is configured is greater than or equal to a first preset value.

Figure 7:
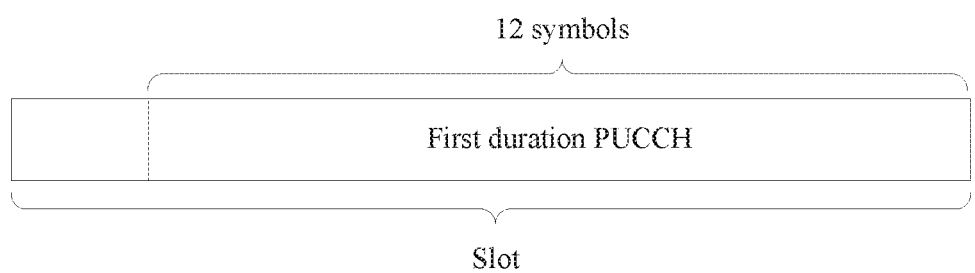
FIG. 7 is a schematic diagram of a time domain resource occupied by a long PUCCH according to an embodiment of this application.

The first preset value obtained by the terminal may be configured by the base station based on an actual communication status, and the first preset value is an integer greater than 4. For example, the first preset value may be 8 or 12. If a quantity of symbols occupied by the first duration PUCCH is greater than eight, a resource, other than the SR resource, on the first time domain resource may be used to carry UCI information of up to 2 bits. For example, referring to FIG. 7, if the first time domain resource is one slot, a quantity of symbols occupied by the first duration PUCCH on the first time domain resource may be 12.

It should be noted that the terminal may send an SR in a plurality of slots at a same location in a plurality of periods. Because quantities of symbols occupied by first duration PUCCHs in the plurality of slots may be different, the base station needs to schedule a terminal based on a minimum quantity of symbols. If the minimum quantity of symbols is 4, when the first duration PUCCH is transmitted through frequency hopping, c=1, and therefore the base station can schedule only one terminal in the plurality of slots, severely limiting a network capacity. Therefore, in this embodiment of this application, a quantity of symbols occupied by a first duration PUCCH in one slot is set to be greater than or equal to the first preset value, and when the first preset value is used in calculation of c, c is usually greater than or equal to 2. In this case, the base station can schedule at least two terminals in the plurality of slots, greatly increasing a network capacity.

Optionally, a larger quantity of symbols occupied by the first duration PUCCH on the first time domain resource indicates a smaller quantity of PRBs on the first time domain resource that are used to transmit an SR; or a larger quantity of symbols occupied by the first duration PUCCH on the first time domain resource indicates a larger shift interval between sequences; or when the quantity of symbols occupied by the first duration PUCCH on the first time domain resource is greater than or equal to a second preset value, the first duration PUCCH on the first time domain resource is transmitted through frequency hopping on the first time domain resource; or when the quantity of symbols occupied by the first duration PUCCH on the first time domain resource is less than a second preset value, the first duration PUCCH on the first time domain resource is transmitted without frequency hopping on the first time domain resource.

In this case, the base station may send first configuration information to the terminal. The first configuration information includes at least one type of the following information: a range that is configured by the base station for the terminal and that is of PRBs on the first time domain resource that are used to transmit an SR, and a shift interval that is between sequences on the first time domain resource and that is configured by the base station for the terminal. A larger quantity of symbols occupied by the first duration PUCCH on the first time domain resource indicates a smaller range of PRBs on the first time domain resource that are used to transmit an SR, and a larger quantity of symbols occupied by the first duration PUCCH on the first time domain resource indicates a larger shift interval between the sequences. The frequency hopping indication sent by the base station to the terminal may be determined in the following manner: When the quantity of symbols occupied by the first duration PUCCH on the first time domain resource is greater than or equal to a second preset value, the first duration PUCCH on the first time domain resource is transmitted by the terminal through frequency hopping on the first time domain resource. When the quantity of symbols occupied by the first duration PUCCH on the first time domain resource is less than a second preset value, the first duration PUCCH on the first time domain resource is transmitted by the terminal without frequency hopping on the first time domain resource.

In a 5G network system, each time domain resource is flexibly used to transmit a PUCCH. To resolve a problem that different time domain resources have different capacities due to different quantities of symbols occupied by first duration PUCCHs, same or similar SR resources need to be carried in the time domain resources, and this may be specifically implemented in any one of the following manners.

Manner 1: On two different time domain resources, a time domain resource on which a larger quantity of symbols are occupied by a first duration PUCCH has a smaller quantity of PRBs used to transmit an SR, so that capacities of the two time domain resources are similar or the same. Specifically, on the two different time domain resources, a ratio of a quantity of symbols occupied by the first duration PUCCH to an OCC multiplexing multiple on one time domain resource may be the same as that on the other time domain resource, so that the capacities of the two different time domain resources are the same.

Figure 8:
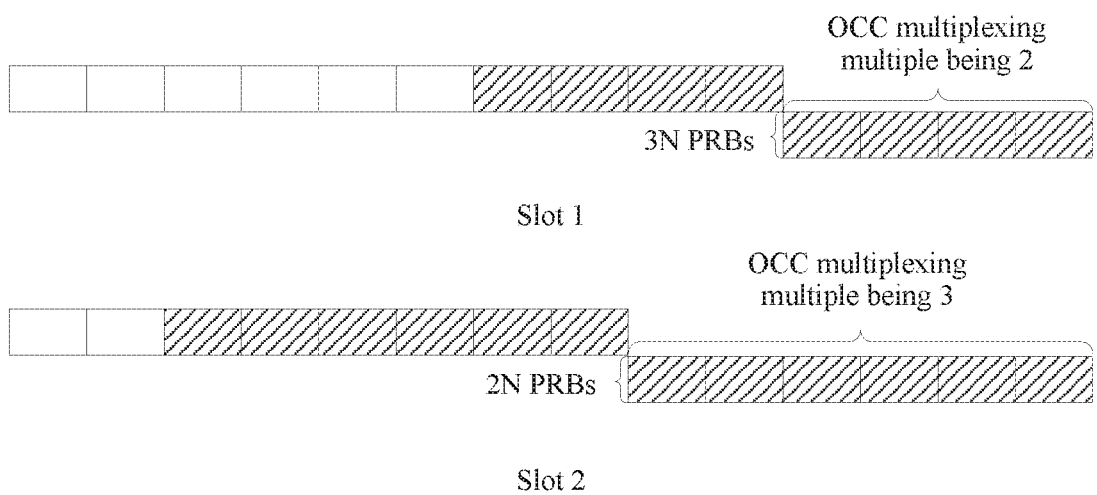
FIG. 8 is a schematic diagram of a relationship between a quantity of symbols occupied by a long PUCCH and a quantity of PRBs according to an embodiment of this application.

For example, as shown in FIG. 8 (a shaded part is a first duration PUCCH a quantity of symbols occupied by the first duration PUCCH in a slot 1 is 8, and if the first duration PUCCH is transmitted through frequency hopping, an OCC multiplexing multiple is 2, and a quantity of PRBs in the slot 1 that are used to transmit an SR may be 3N; a quantity of symbols occupied by the first duration PUCCH in a slot 2 is 12, and if the first duration PUCCH is transmitted through frequency hopping, an OCC multiplexing multiple is 3, and a quantity of PRBs in the slot 2 that are used to transmit an SR may be 2N, where N is an integer greater than 0.

When different time domain resources need to carry same or similar SR resources in manner 1, a quantity of PRBs used to transmit an SR is small on a time domain resource on which a larger quantity of symbols are occupied by the first duration PUCCH, and therefore, the base station may allocate more PRBs to transmit other data or signaling.

It should be noted that the quantity of PRBs on the time domain resource changes with the quantity of symbols occupied by the first duration PUCCH on the time domain resource, and therefore, when the terminal transmits a first duration PUCCH in another format, the terminal may obtain, from the base station, a quantity of PRBs for transmitting the first duration PUCCH in another format, and determine, based on the quantity of PRBs, a specific PRB for transmitting the first duration PUCCH in another format.

In an implementation process, the terminal may transmit an SR on subcarriers in a plurality of PRBs by using a spread spectrum sequence with a length of 12N' in frequency domain, or transmit an SR on subcarriers at intervals of N' subcarriers in a plurality of PRBs by using a spread spectrum sequence with a length of 12, or determine, based on configuration of the base station, to transmit an SR on one specific PRB, where N' is an integer greater than 0.

Manner 2: On two different time domain resources, a time domain resource on which a larger quantity of symbols are occupied by a first duration PUCCH has a larger shift interval between sequences, so that capacities of the two time domain resources are similar or the same. Specifically, on the two different time domain resources, a ratio of a quantity of symbols occupied by the first duration PUCCH to a shift interval between sequences on one time domain resource may be the same as that on the other time domain resource, so that the capacities of the two different time domain resources are the same.

Figure 9:
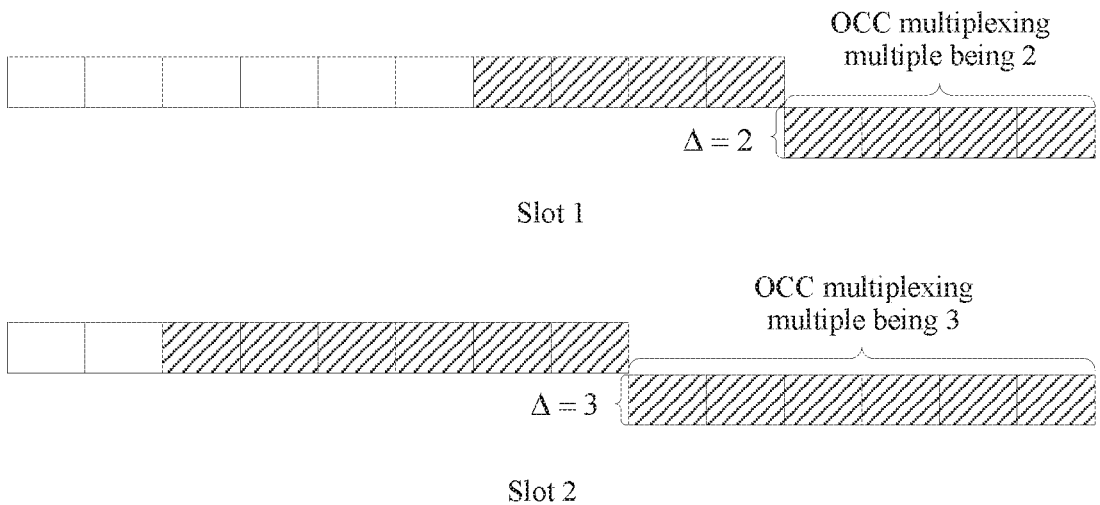
FIG. 9 is a schematic diagram of a relationship between a quantity of symbols occupied by a long PUCCH and a shift interval between sequences according to an embodiment of this application.

For example, referring to FIG. 9 (a shaded part is a first duration PUCCH), a quantity of symbols occupied by the first duration PUCCH in a slot 1 is 8, and if the first duration PUCCH is transmitted through frequency hopping, an OCC multiplexing multiple is 2, and $\Delta=2$; and a quantity of symbols occupied by the first duration PUCCH in a slot 2 is 12, and if the first duration PUCCH is transmitted through frequency hopping, an OCC multiplexing multiple is 3, and $\Delta=3$.

Manner 3: When a quantity of symbols occupied by a first duration PUCCH on one time domain resource is greater than or equal to a second preset value, the first duration PUCCH is transmitted through frequency hopping on the time domain resource; or when a quantity of symbols occupied by a first duration PUCCH on one time domain resource is less than a second preset value, the first duration PUCCH is transmitted without frequency hopping on the time domain resource.

For example, the second preset value may be 6 or 8.

Figure 10:
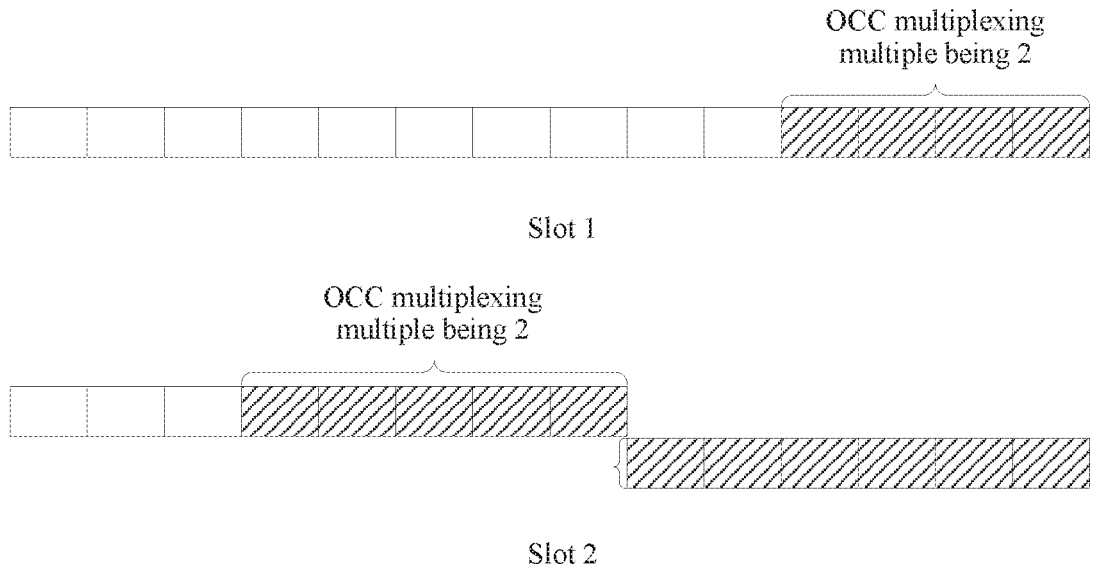
FIG. 10 is a schematic diagram of a relationship between a quantity of symbols occupied by a long PUCCH and whether to transmit the long PUCCH through frequency hopping according to an embodiment of this application.

For example, referring to FIG. 10, if a quantity of symbols occupied by a first duration PUCCH in a slot 1 is 4, the first duration PUCCH is transmitted without frequency hopping; or if a quantity of symbols occupied by a first duration PUCCH in a slot 2 is 11, the first duration PUCCH is transmitted through frequency hopping, and frequency hopping parts are five symbols and six symbols. In this case, OCC multiplexing multiples of the slot 1 and the slot 2 are 2.

For example, if a quantity of symbols occupied by a first duration PUCCH on a time domain resource is 4 to 5, and a quantity of symbols occupied by a first duration PUCCH on a next time domain resource is 8 to 11, the first duration PUCCH is transmitted without frequency hopping on the time domain resource, the first duration PUCCH is transmitted through frequency hopping on the next time domain resource, and both OCC multiplexing multiples are 2; or if a quantity of symbols occupied by a first duration PUCCH on a time domain resource is 6 to 7, and a quantity of symbols occupied by a first duration PUCCFI on a next time domain resource is 12 to 14, the first duration PUCCH is transmitted without frequency hopping on the time domain resource, the first duration PUCCH is transmitted through frequency hopping on the next time domain resource, and both OCC multiplexing multiples are 3.

Optionally, in this embodiment of this application, if a time domain resource includes a first duration PUCCH occupying 14 or more symbols, an OCC length may be 6 or 7. In this case, because the OCC multiplexing multiple is increased, more terminals can be supported in the network system to transmit an SR.

For example, if a quantity of symbols occupied by a first duration PUCCH in one slot is 14, when the first duration PUCCH is transmitted without frequency hopping, an OCC length may reach 6 or 7, and an OCC multiplexing multiple may be 5, 6, or 7.

In this case, for a sequence whose OCC length is 6, refer to Table 1. For a sequence whose OCC length is 7, refer to Table 2.

TABLE 1

| Sequence number | Sequence |
|---|---|
| 0 | [1, 1, 1, 1, 1, 1] |
| 1 | $[1, e^{j\frac{2\Pi}{3}}, e^{j\frac{4\Pi}{3}}, 1, e^{j\frac{2\Pi}{3}}, e^{j\frac{4\Pi}{3}}]$ |
| 2 | $[1, e^{j\frac{4\Pi}{3}}, e^{j\frac{2\Pi}{3}}, 1, e^{j\frac{4\Pi}{3}}, e^{j\frac{2\Pi}{3}}]$ |
| 3 | [1, 1, 1, −1, −1, −1] |
| 4 | $[1, e^{j\frac{2\Pi}{3}}, e^{j\frac{4\Pi}{3}}, -1, e^{j\frac{5\Pi}{3}}, e^{j\frac{\Pi}{3}}]$ |
| 5 | $[1, e^{j\frac{4\Pi}{3}}, e^{j\frac{2\Pi}{3}}, -1, e^{j\frac{\Pi}{3}}, e^{j\frac{5\Pi}{3}}]$ |

Certainly, Table 1 merely shows a correspondence between a sequence number and a sequence as an example. Actually, the sequence number and the sequence may have another correspondence.

TABLE 2

| Sequence number | Sequence |
|---|---|
| 0 | [1, 1, 1, 1, 1, 1, 1] |
| 1 | $[1, e^{j\frac{2\Pi}{7}}, e^{j\frac{4\Pi}{7}}, e^{j\frac{6\Pi}{7}}, e^{j\frac{8\Pi}{7}}, e^{j\frac{10\Pi}{7}}, e^{j\frac{12\Pi}{7}}]$ |
| 2 | $[1, e^{j\frac{4\Pi}{7}}, e^{j\frac{8\Pi}{7}}, e^{j\frac{12\Pi}{7}}, e^{j\frac{2\Pi}{7}}, e^{j\frac{6\Pi}{7}}, e^{j\frac{10\Pi}{7}}]$ |
| 3 | $[1, e^{j\frac{6\Pi}{7}}, e^{j\frac{12\Pi}{7}}, e^{j\frac{4\Pi}{7}}, e^{j\frac{10\Pi}{7}}, e^{j\frac{2\Pi}{7}}, e^{j\frac{8\Pi}{7}}]$ |
| 4 | $[1, e^{j\frac{8\Pi}{7}}, e^{j\frac{2\Pi}{7}}, e^{j\frac{10\Pi}{7}}, e^{j\frac{4\Pi}{7}}, e^{j\frac{12\Pi}{7}}, e^{j\frac{6\Pi}{7}}]$ |
| 5 | $[1, e^{j\frac{10\Pi}{7}}, e^{j\frac{6\Pi}{7}}, e^{j\frac{2\Pi}{7}}, e^{j\frac{12\Pi}{7}}, e^{j\frac{8\Pi}{7}}, e^{j\frac{4\Pi}{7}}]$ |
| 6 | $[1, e^{j\frac{12\Pi}{7}}, e^{j\frac{10\Pi}{7}}, e^{j\frac{8\Pi}{7}}, e^{j\frac{6\Pi}{7}}, e^{j\frac{4\Pi}{7}}, e^{j\frac{2\Pi}{7}}]$ |

Certainly, Table 2 merely shows a correspondence between a sequence number and a sequence as an example. Actually, the sequence number and the sequence may have another correspondence.

Figure 11:
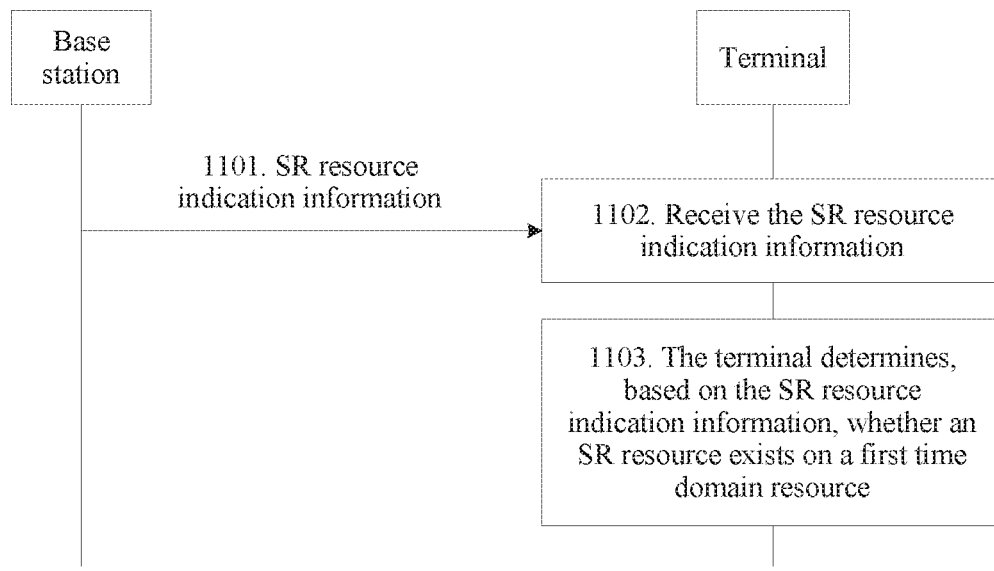
FIG. 11 is a flowchart of a resource determining method according to an embodiment of this application.

An embodiment of this application further provides a resource determining method. As shown in FIG. 11, the method includes the following steps.

1101. A base station sends SR resource indication information to a terminal.

For descriptions of the SR resource indication information, refer to the foregoing descriptions. Details are not described herein again. In the following descriptions, the SR resource indication information being an SR resource number is used as an example to describe the method provided in this embodiment of this application.

1102. The terminal receives the SR resource indication information from the base station.

1103. The terminal determines, based on the SR resource indication information, whether an SR resource exists on a first time domain resource.

If the terminal determines that an SR resource exists on the first time domain resource, the terminal may determine an SR resource location on the first time domain resource by using the method shown in FIG or if the terminal determines that no SR resource exists on the first time domain resource, the terminal does not send an SR on the first time domain resource.

According to the method provided in this embodiment of this application, after receiving the SR resource indication information sent by the base station, the terminal may determine, based on the SR resource indication information, whether an SR resource exists on the first time domain resource, so as to determine whether to transmit an SR on the first time domain resource. A resource conflict does not occur even if different quantities of symbols occupied by first duration PUCCHs result in different capacities of different slots.

Optionally, the first time domain resource includes one slot. During specific implementation, step 1103 may include the following steps.

(11) The base station sends first information to the terminal, where the first information includes at least one of a quantity of SR resources on the first time domain resource, a range of PRBs on the first time domain resource that are capable of transmitting an SR, and a quantity of all PRBs on the first time domain resource.

The quantity of SR resources may be used to determine an SR resource number upper-bound, for example, the quantity of SR resources may be a quantity of resources corresponding to an SR resource number that is less than or equal to the SR resource number upper-bound; or may be a range of frequency domain PRBs; or may be another parameter that may be used to calculate the SR resource number upper-bound. For example, the base station may indicate one or more ranges of PRBs to the terminal. The range of PRBs may be indicated by a start PRB and an end PRB. For example, the range of PRBs may be indicated by a start PRB number and an end PRB number. The terminal multiplies the one or more ranges of PRBs by 2 to obtain a range of frequency domain PRBs of the terminal on an entire frequency band. A range of PRBs on the first time domain resource that are capable of transmitting an SR may be indicated in the following manner: If a range of PRBs on the first time domain resource that are capable of transmitting an SR is PRBs numbered from A to B, the base station may indicate A and B to the terminal; and if A=0, the base station may indicate only B to the terminal, and the terminal may determine, based on the indication, the range of PRBs on the first time domain resource that are capable of transmitting an SR.

Optionally, a larger quantity of symbols occupied by the first duration PUCCH on the first time domain resource indicates a smaller range of PRBs on the first time domain resource that are capable of transmitting an SR, and/or the base station sends second configuration information to the terminal. The second configuration information includes at least one type of the following information: a shift interval that is between sequences on the first time domain resource and that is configured by the base station for the terminal, and an indication configured by the base station for the terminal for indicating whether the first duration PUCCH on the first time domain resource is transmitted through frequency hopping on the first time domain resource. A larger quantity of symbols occupied by the first duration PUCCH on the first time domain resource indicates a larger shift interval between the sequences. When the quantity of symbols occupied by the first duration PUCCH on the first time domain resource is greater than or equal to a second preset value, the first duration PUCCH on the first time domain resource is transmitted through frequency hopping on the first time domain resource. When the quantity of symbols occupied by the first duration PUCCH on the first time domain resource is less than a second preset value, the first duration PUCCH on the first time domain resource is transmitted without frequency hopping on the first time domain resource. Therefore, capacities of different time domain resources are similar or the same. For specific related explanations, refer to the foregoing descriptions.

(12) The terminal obtains the quantity of SR resources on the first time domain resource.

Optionally, the quantity of SR resources on the first time domain resource is configured by the base station; or the quantity of SR resources on the first time domain resource is calculated by the terminal based on a range of PRBs on the first time domain resource that are capable of transmitting an SR or based on a quantity of all PRBs on the first time domain resource.

Specifically, the terminal may directly determine the quantity of SR resources, included in the first information, as the quantity of SR resources on the first time domain resource, or may calculate the quantity of SR resources on the first time domain resource based on the range of PRBs on the first time domain resource that are capable of transmitting an SR or based on the quantity of all PRBs on the first time domain resource.

Optionally, after step (12), the terminal may determine an SR resource number upper-bound of the first time domain resource according to the quantity of SR resources on the first time domain resource.

For example, the SR resource number upper-bound of the first time domain resource may be calculated in the following formula:

$$n_{PUCCH}^{upperbound} = \frac{x \cdot c \cdot N_{SC}^{RB}}{\Delta} - 1,$$

where $n_{PUCCH}^{upperbound}$ is the SR resource number upper-bound of the first time domain resource, x is the range of PRBs on the first time domain resource that are capable of transmitting an SR or the quantity of all PRBs on the first time domain resource, and c is the OCC multiplexing multiple of the first time domain resource. For a calculation method, refer to the foregoing descriptions.

(13) The terminal determines, based on the SR resource indication information and the quantity of SR resources on the first time domain resource, whether an SR resource exists on the first time domain resource.

In a possible implementation, the SR resource indication information is an SR resource number, and the quantity of SR resources is used to determine an SR resource number upper-bound. When the SR resource number is less than or equal to an SR resource number upper-bound of the first time domain resource, an SR resource exists on the first time domain resource; otherwise, no SR resource exists on the first time domain resource.

In another possible implementation, the terminal may obtain, through calculation based on the SR resource number, a frequency domain resource location on the SR resource on the first time domain resource, and if the frequency domain resource location on the SR resource on the first time domain resource does not exceed the range of PRBs on the first time domain resource in the first information that are capable of transmitting an SR, the terminal determines that an SR resource exists on the first time domain resource; otherwise, the terminal determines that no SR resource exists on the first time domain resource.

Optionally, the first time domain resource includes m slots, and m is an integer greater than or equal to 2. During specific implementation, step 1103 may include the following steps.

(21) The terminal obtains a quantity of SR resources in the m slots.

Specifically, for a method for obtaining an SR resource number upper-bound in each slot by the terminal, refer to the foregoing descriptions.

(22) The terminal determines, based on the SR resource indication information and the quantity of SR resources in the m slots, whether an SR resource exists on the first time domain resource.

During specific implementation of step 22, in a possible implementation, the SR resource indication information is an SR resource number, and a quantity of SR resources is used to determine an SR resource number upper-bound. When the SR resource number is between a first value and a second value, an SR resource for the terminal is located on a first duration PUCCH in the $(n+1)^{th}$ slot in the m slots; otherwise, no SR resource for the terminal exists in the m slots. The first value is a sum of SR resource number upper-bounds of first n slots in the m slots, and the second value is a sum of SR resource number upper-bounds of first (n+1) slots in the m slots.

Specifically, if $$\sum_{i=1}^{n} n_{PUCCH,i}^{upperbound} < n_{PUCCH} \le \sum_{i=1}^{n+1} n_{PUCCH,i}^{upperbound},$$

the SR resource for the terminal is located on the first duration PUCCH in the $(n+1)^{th}$ slot carrying the SR resource.

In a possible implementation, the SR resource indication information is an SR resource number, and a quantity of SR resources is used to determine an SR resource number upper-bound. When the SR resource number is less than or equal to an SR resource number upper-bound of a first slot in the in slots, an SR resource for the terminal is located on a first duration PUCCH in at least two slots including the first slot, and the first slot is a slot with a smallest SR resource number upper-bound in the m slots.

In another possible implementation, the SR resource indication information is an SR resource number, and a quantity of SR resources is used to determine an SR resource number upper-bound. When the SR resource number is less than or equal to a first SR resource number upper-bound, an SR resource for the terminal is located on the first duration PUCCH on the first time domain resource; otherwise, the terminal has no SR resource on the first time domain resource. The first SR resource number upper-bound is an SR resource number upper-bound calculated by the terminal based on a total number of symbols occupied by the first duration PUCCH on the first time domain resource. For example, c may be first calculated based on the total number of symbols occupied by first duration PUCCHs in all slots, on the first time domain resource, in which the SR resource is configured (for a specific calculation method, refer to the foregoing descriptions), and then the first SR resource number upper-bound is calculated based on c (for a specific calculation method, refer to the foregoing descriptions). Specifically, if the SR resource number is less than or equal to the first SR resource number upper-bound, the SR resource for the terminal is a PUCCH resource including the first duration PUCCHs in all the slots, on the first time domain resource, in which the SR resource is configured. During transmission without frequency hopping, an OCC length used for a sum of quantities of symbols occupied by first duration PUCCHs in all the slots, on the first time domain resource, in which the SR resource is configured is $$\left\lfloor \frac{L'_{PUCCH}}{2} \right\rfloor \text{ or } \left\lceil \frac{L_{PUCCH}}{2} \right\rceil;$$

or during transmission through frequency hopping, an OCC length used for a sum of quantities of symbols occupied by first duration PUCCHs in all the slots, on the first time domain resource, in which the SR resource is configured is $$\left\lfloor \frac{L'_{PUCCH}}{4} \right\rfloor \text{ or } \left\lceil \frac{L_{PUCCH}}{4} \right\rceil,$$

where $L_{PUCCH}$ is the sum of quantifies of symbols occupied by first duration PUCCHs in all the slots, on the first time domain resource, in which the SR resource is configured.

Figure 12:
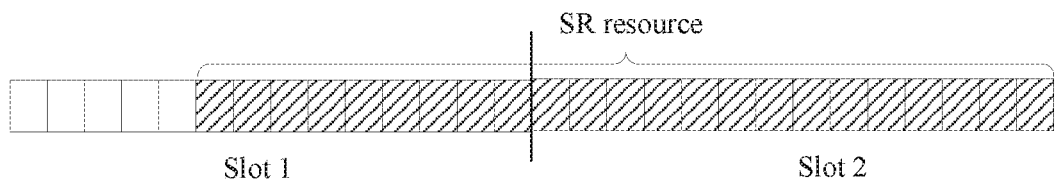
FIG. 12 is a schematic diagram of long PUCCHs in a plurality of slots according to an embodiment of this application.

For example, referring to FIG. 12, when a quantity of symbols occupied by a first duration PUCCH in a slot 1 is 9, and a quantity of symbols occupied by a first duration PUCCH in a slot 2 is 14, an SR resource for the terminal may be a PUCCH resource including the first duration PUCCH in the slot 1 and the first duration PUCCH in the slot 2, and an OCC length used for the resource may be 11 or 12.

When the first time domain resource has m slots, the SR resource may be specifically represented by three parameters: an OCC number, a frequency domain location, and a cyclic shift. The terminal may determine the SR resource location on the first time domain resource based on the SR resource indication information and the OCC multiplexing multiple of the first time domain resource, and this process may specifically include the following cases:

(1) A specific method for determining an OCC number of the first time domain resource based on the SR resource indication information and the OCC multiplexing multiple of the first time domain resource includes:

$$n'(n_s) = \begin{cases} \dfrac{\left(n_{PUCCH} - \sum_{i=1}^{n} n_{PUCCH,i}^{upperbound}\right)}{\mod(c \cdot N_{SC}^{RB}/\Delta)} & \text{first frequency hopping part} \\ \dfrac{[c(n'(n_s-1))]}{\mod(c \cdot N_{SC}^{RB}/\Delta)} & \text{second frequency hopping part} \end{cases} ;$$

and $n_{oc}(n_s) = \lfloor n'(n_s) \cdot \Delta / N_{SC}^{RB} \rfloor.$

For a meaning of each parameter, refer to the foregoing descriptions.

(2) A specific method for determining a frequency domain location on the first time domain resource based on the SR resource indication information and the OCC multiplexing multiple of the first time domain resource includes:

$$n_{PRB} = \begin{cases} \left\lfloor \dfrac{\left\lfloor \dfrac{n_{PUCCH} - \sum_{i=1}^{n} n_{PUCCH,i}^{upperbound}}{c \cdot N_{SC}^{RB}/\Delta} \right\rfloor}{2} \right\rfloor & \text{first frequency hopping part} \\ N_{RB}^{UL} - 1 - \left\lfloor \dfrac{\left\lfloor \dfrac{n_{PUCCH} - \sum_{i=1}^{n} n_{PUCCH,i}^{upperbound}}{c \cdot N_{SC}^{RB}/\Delta} \right\rfloor}{2} \right\rfloor & \text{second frequency hopping part} \end{cases}$$

For a meaning of each parameter, refer to the foregoing descriptions.

(3) A specific method for determining a cyclic shift on the first time domain resource based on the SR resource indication information and the OCC multiplexing multiple of the first time domain resource includes:

$$n_{cs}(n_s, l) = [n_{cs}^{cell}(n_s, l) + (n'(n_s) \cdot \Delta + (n_{oc}(n_s) \mod \Delta)) \mod N_{SC}^{RB}] \mod N_{SC}^{RB}.$$

$$\partial_p(n_s, l) = 2\pi \cdot n_{cs}(n_s, l)/N_{SC}^{RB}$$

For a meaning of each parameter, refer to the foregoing descriptions.

Calculation manners of the foregoing three parameters are mutually independent.

Optionally, SR resource indication information varies on different time domain resources.

Figure 13:
FIG. 13 is a schematic diagram of different SR resource numbers in different slots according to an embodiment of this application.

It should be noted that, for a terminal to which a smaller SR resource number is allocated, a probability of occurrence of an SR resource is far higher than that for a terminal to which a larger SR resource number is allocated. As a result, uneven resources are allocated between terminals. To balance the resource allocation, an SR resource number of a terminal is changed at regular intervals, for example, from a smaller SR resource number to a larger SR resource number. For example, the base station reconfigures an SR resource number at regular intervals, or the base station configures a number sequence for the terminal, so that the terminal changes an SR resource number at regular intervals based on the number sequence. For example, referring to FIG. 13, an SR resource number for slots from a slot 1 to a slot 11 of a terminal may be X, an SR resource number for slots from a slot 21 to a slot 31 may be Y, and values of X and Y are unequal.

Optionally, when the terminal determines that no SR resource exists on the first time domain resource, an SR count increases by 1, and when the SR count reaches an upper bound, the terminal re-initiates random access.

Optionally, a quantity of symbols occupied by a first duration PUCCH in a slot, on the first time domain resource, in which an SR resource is configured is greater than or equal to a first preset value. For an explanation related to the optional method, refer to the foregoing descriptions. Details are not described again herein.

In this embodiment of this application, the base station may further allocate a time domain resource to the terminal. In LTE, the terminal may determine, by using an SR configuration number table, a time domain resource used for transmitting an SR The SR configuration number table is a table of an SR configuration index (SR configuration index), including an SR periodicity (SR periodicity (ms)) and an SR subframe offset (SR subframe offset). In 5G NR, a slot is used as a unit of a periodicity for a long PUCCH bearing an SR, and an offset of a slot is correspondingly used as a parameter, to be specific, the SR configuration number table includes an SR periodicity (slot) and an SR slot offset (slot offset). Based on 5G NR, the SR configuration number table may be updated to Table 3.

TABLE 3

| SR configuration index $I_{SR}$ | SR periodicity (slot) $SR_{PERIODICITY}$ | SR slot offset $N_{OFFSET, SR}$ |
|---|---|---|
| 0 to 4 | 5 | $I_{SR}$ |
| 5 to 14 | 10 | $I_{SR} - 5$ |
| 15 to 34 | 20 | $I_{SR} - 15$ |
| 35 to 74 | 40 | $I_{SR} - 35$ |
| 75 to 154 | 80 | $I_{SR} - 75$ |
| 155 to 156 | 2 | $I_{SR} - 155$ |
| 157 | 1 | $I_{SR} - 157$ |

Further, when some slots correspond to no SR resource, to describe the SR periodicity more accurately, a parameter of the SR periodicity may be set to {X, uncertain}, where X is a corresponding slot periodicity. Table 3 may be updated to Table 4, where M is an integer greater than or equal to 0.

TABLE 4

| SR configuration index $I_{SR}$ | SR periodicity (slot) $SR_{PERIODICITY}$ | SR slot offset $N_{OFFSET, SR}$ |
|---|---|---|
| M to M + 4 | {5, uncertain} | $I_{SR} - M$ |
| M + 5 to M + 14 | {10, uncertain} | $I_{SR} - (M + 5)$ |
| M + 15 to M + 34 | {20, uncertain} | $I_{SR} - (M + 15)$ |
| M + 35 to M + 74 | {40, uncertain} | $I_{SR} - (M + 35)$ |
| M + 75 to M + 154 | {80, uncertain} | $I_{SR} - (M + 75)$ |
| M + 155 to M + 156 | {2, uncertain} | $I_{SR} - (M + 155)$ |
| M + 157 | {1, uncertain} | $I_{SR} - (M + 157)$ |

The foregoing mainly describes the solutions provided in the embodiments of this application from the perspective of interaction between network elements. It may be understood that, to implement the foregoing functions, the resource determining apparatus or the resource location determining apparatus includes a corresponding hardware structure and/or software module for implementing each function. A person skilled in the art should be easily aware that units and algorithm steps in the examples described with reference to the embodiments provided in this specification may be implemented in a form of hardware or in a form of a combination of hardware and computer software in this application. Whether a function is implemented by hardware or in a manner of driving hardware by a computer software depends on a particular application and a design constraint condition of the technical solution. A person skilled in the art may use different methods to implement the described functions for each particular application, but it should not be considered that the implementation goes beyond the scope of this application.

In the embodiments of this application, function modules of the resource determining apparatus or the resource location determining apparatus may be obtained through division based on the foregoing method examples. For example, each function module may be obtained through division based on each function, or two or more functions may be integrated into one processing module. The integrated module may be implemented in a form of hardware, or may be implemented in a form of a functional module of software. It should be noted that module division in the embodiments of this application is an example and is merely logical function division. During actual implementation, there may be another division manner.

Figure 14:
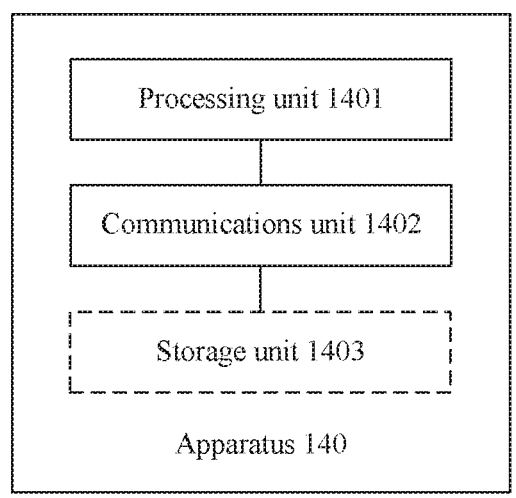
FIG. 14 is a schematic composition diagram of an apparatus according to an embodiment of this application.

When an integrated unit is used, FIG. 14 shows a possible schematic structural diagram of an apparatus 140 in the foregoing embodiments. The apparatus 140 may be a resource location determining apparatus or a resource determining apparatus, and may be specifically a base station. The apparatus 140 includes a processing unit 1401 and a communications unit 1402, and may further include a storage unit 1403. The processing unit 1401 is configured to control and manage an action executed by the base station. For example, the processing unit 1401 is configured to support the base station to execute the process 601 in FIG. 6 or the process 1101 in FIG. 11, and/or an action executed by the base station in another process described in the embodiments of this application. The communications unit 1402 is configured to support communication between the base station and another network entity, for example, communication with the terminal in FIG. 6. The storage unit 1403 is configured to store program code and data of the base station.

The processing unit 1401 may be a processor or a controller. The communications unit 1402 may be a communications interface, a transceiver, a transceiver circuit, or the like. The communications interface is a general term, and may include one or more interfaces. The storage unit 1403 may be a memory. When the processing unit 1401 is a processor, the communications unit 1402 is a communications interface, and the storage unit 1403 is a memory, the resource determining apparatus or the resource location determining apparatus in this embodiment of this application may be the base station shown in FIG. 4. A processor 401 is configured to control and manage an action executed by the base station. For example, the processor 401 is configured to support the base station to execute the process 601 in FIG. 6 or the process 1101 in FIG. 11, and/or an action executed by the base station in another process described in the embodiments of this application.

Figure 15:
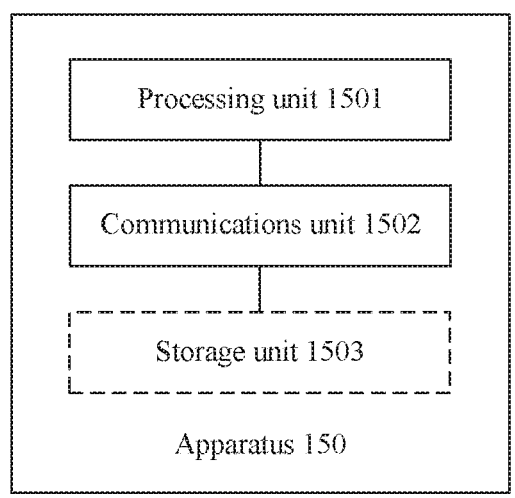
FIG. 15 is a schematic composition diagram of an apparatus according to an embodiment of this application.

When an integrated unit is used. FIG. 15 shows a possible schematic structural diagram of an apparatus 150 in the foregoing embodiments. The apparatus 150 may be a resource location determining apparatus or a resource determining apparatus, and may be specifically a terminal. The apparatus 150 includes a processing unit 1501 and a communications unit 1502, and may further include a storage unit 1503. The processing unit 1501 is configured to control and manage an action executed by the terminal. For example, the processing unit 1501 is configured to support the terminal to execute the processes 602 and 603 in FIG. 6 or the processes 1102 and 1103 in FIG. 11, and/or an action executed by the terminal in another process described in the embodiments of this application. The communications unit 1502 is configured to support communication between the terminal and another network entity, for example, communication with the base station in FIG. 6, and the storage unit 1503 is configured to store program code and data of the terminal.

The processing unit 1501 may be a processor or a controller, and the communications unit 1502 may be a communications interface, a transceiver, a transceiver circuit, or the like. The communications interface is a general term, and may include one or more interfaces. The storage unit 1503 may be a memory. When the processing unit 1501 is a processor, the communications unit 1502 is a communications interface, and the storage unit 1503 is a memory, the resource determining apparatus or the resource location determining apparatus in this embodiment of this application may be the terminal shown in FIG. 5. A processor 501 is configured to control and manage an action executed by the terminal, For example, the processor 501 is configured to support the terminal to execute the processes 602 and 603 in FIG. 6 or the processes 1102 and 1103 in FIG. 11, and/or an action executed by the terminal in another process described in the embodiments of this application.

An embodiment of this application further provides a computer readable storage medium, including an instruction. When the instruction runs on a computer, the computer performs the foregoing methods.

An embodiment of this application further provides a computer program product including an instruction. When the instruction runs on the computer, the computer performs the foregoing methods.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL for short)) or wireless (for example, infrared, radio, or a microwave) manner. The computer-readable storage medium may be any available medium accessible by a computer, or a data storage device, such as a server or a data center, integrating one or more available media. The usable medium may be a magnetic medium (for example, a floppy disk, a hard disk, or a magnetic tape), an optical medium (for example, a DVD), a semiconductor medium (for example, a solid state disk (Solid State Disk, SSD for short)), or the like.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the word "comprise" (comprising) does not exclude another component or step, and "a" or "one" does not exclude a case of plurality. A single processor or another unit may implement several functions enumerated in the claims. Some measures are described in dependent claims that are different from each other, but this does not mean that these measures cannot be combined to produce a better effect.

Although this application is described with reference to specific features and the embodiments thereof, apparently, various modifications and combinations may be made to them without departing from the spirit and scope of this application. Correspondingly, the specification and accompanying drawings are merely examples of descriptions of this application defined by the appended claims, and is considered as any of or all modifications, variations, combinations or equivalents that cover the scope of this application. Apparently, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A resource determining method, implemented by a terminal, wherein the resource determining method comprises:
   receiving scheduling request (SR) resource indication information from a base station, wherein the SR resource indication information indicates an SR resource; and
   transmitting an SR on a physical uplink control channel (PUCCH) at a slot based on the SR resource and an orthogonal cover code (OCC), wherein a quantity of symbols occupied by the PUCCH is 14 symbols, and wherein a length of the OCC is 7 when the PUCCH is transmitted without frequency hopping.

2. The resource determining method of claim 1, wherein a sequence of the OCC is any one of the following sequences: [1, 1, 1, 1, 1, 1, 1], $$\left[1, e^{j\frac{2\Pi}{7}}, e^{j\frac{4\Pi}{7}}, e^{j\frac{6\Pi}{7}}, e^{j\frac{8\Pi}{7}}, e^{j\frac{10\Pi}{7}}, e^{j\frac{12\Pi}{7}}\right],$$

$$\left[1, e^{j\frac{4\Pi}{7}}, e^{j\frac{8\Pi}{7}}, e^{j\frac{12\Pi}{7}}, e^{j\frac{2\Pi}{7}}, e^{j\frac{6\Pi}{7}}, e^{j\frac{10\Pi}{7}}\right],$$

$$\left[1, e^{j\frac{6\Pi}{7}}, e^{j\frac{12\Pi}{7}}, e^{j\frac{4\Pi}{7}}, e^{j\frac{10\Pi}{7}}, e^{j\frac{2\Pi}{7}}, e^{j\frac{8\Pi}{7}}\right],$$

$$\left[1, e^{j\frac{8\Pi}{7}}, e^{j\frac{2\Pi}{7}}, e^{j\frac{10\Pi}{7}}, e^{j\frac{4\Pi}{7}}, e^{j\frac{12\Pi}{7}}, e^{j\frac{6\Pi}{7}}\right],$$

$$\left[1, e^{j\frac{10\Pi}{7}}, e^{j\frac{6\Pi}{7}}, e^{j\frac{2\Pi}{7}}, e^{j\frac{12\Pi}{7}}, e^{j\frac{8\Pi}{7}}, e^{j\frac{4\Pi}{7}}\right], \text{ or}$$

$$\left[1, e^{j\frac{12\Pi}{7}}, e^{j\frac{10\Pi}{7}}, e^{j\frac{8\Pi}{7}}, e^{j\frac{6\Pi}{7}}, e^{j\frac{4\Pi}{7}}, e^{j\frac{2\Pi}{7}}\right].$$

3. The resource determining method of claim 1, wherein a multiplexing multiple of the OCC is 6 or 7.

4. The resource determining method of claim 1, wherein the quantity of symbols by the PUCCH is configured by the base station.

5. The resource determining method of claim 1, wherein the OCC is a multiplexing multiple of a first time domain resource.

6. The resource determining method of claim 5, further comprising determining whether the SR resource exists on the first time domain resource.

7. The resource determining method of claim 5, further comprising calculating the multiplexing multiple of the first time domain resource when a first duration PUCCH transmits with frequency hopping on the first time domain resource or when the first duration PUCCH transmits without frequency hopping on the first time domain resource.

8. A terminal device, comprising:
a processor; and
a memory coupled to the processor and storing instructions that, when executed by the processor, cause the terminal device to be configured to:
receive scheduling request (SR) resource indication information from a base station, wherein the SR resource indication information indicates an SR resource; and
transmit an SR on a physical uplink control channel (PUCCH) at a slot based on the SR resource and an orthogonal cover code (OCC), wherein a quantity of symbols occupied by the PUCCH is 14 symbols, and wherein length of the OCC is 7 symbols when the PUCCH is transmitted without frequency hopping.

9. The terminal device of claim 8, wherein a sequence of the OCC is any one of the following sequences: [1, 1, 1, 1, 1, 1, 1], $$\left[1, e^{j\frac{2\Pi}{7}}, e^{j\frac{4\Pi}{7}}, e^{j\frac{6\Pi}{7}}, e^{j\frac{8\Pi}{7}}, e^{j\frac{10\Pi}{7}}, e^{j\frac{12\Pi}{7}}\right],$$

$$\left[1, e^{j\frac{4\Pi}{7}}, e^{j\frac{8\Pi}{7}}, e^{j\frac{12\Pi}{7}}, e^{j\frac{2\Pi}{7}}, e^{j\frac{6\Pi}{7}}, e^{j\frac{10\Pi}{7}}\right],$$

$$\left[1, e^{j\frac{6\Pi}{7}}, e^{j\frac{12\Pi}{7}}, e^{j\frac{4\Pi}{7}}, e^{j\frac{10\Pi}{7}}, e^{j\frac{2\Pi}{7}}, e^{j\frac{8\Pi}{7}}\right],$$

$$\left[1, e^{j\frac{8\Pi}{7}}, e^{j\frac{2\Pi}{7}}, e^{j\frac{10\Pi}{7}}, e^{j\frac{4\Pi}{7}}, e^{j\frac{12\Pi}{7}}, e^{j\frac{6\Pi}{7}}\right],$$

$$\left[1, e^{j\frac{10\Pi}{7}}, e^{j\frac{6\Pi}{7}}, e^{j\frac{2\Pi}{7}}, e^{j\frac{12\Pi}{7}}, e^{j\frac{8\Pi}{7}}, e^{j\frac{4\Pi}{7}}\right], \text{ or}$$

$$\left[1, e^{j\frac{12\Pi}{7}}, e^{j\frac{10\Pi}{7}}, e^{j\frac{8\Pi}{7}}, e^{j\frac{6\Pi}{7}}, e^{j\frac{4\Pi}{7}}, e^{j\frac{2\Pi}{7}}\right].$$

10. The terminal device of claim 8, wherein a multiplexing multiple of the OCC is 6 or 7.

11. The terminal device of claim 8, wherein the quantity of symbols by the PUCCH is configured by the base station.

12. The terminal device of claim 8, wherein the OCC is a multiplexing multiple of a first time domain resource.

13. The terminal device of claim 12, further configured to determine whether the SR resource exists on the first time domain resource.

14. The terminal device of claim 12, further configured to calculate the multiplexing multiple of the first time domain resource when a first duration PUCCH transmits with frequency hopping on the first time domain resource or when the first duration PUCCH transmits without frequency hopping on the first time domain resource.

15. A computer program product comprising computer-executable instructions stored on a non-transitory computer-readable medium that, when executed by a processor, cause an electronic device to:
receive scheduling request (SR) resource indication information from a base station, wherein the SR resource indication information indicates an SR resource; and
transmit an SR on a physical uplink control channel (PUCCH) at a slot based on the SR resource and an orthogonal cover code (OCC), wherein a quantity of symbols occupied by the PUCCH is 14 symbols, and wherein length of the OCC is 7 when the PUCCH is transmitted without frequency hopping.

16. The computer program product of claim 15, wherein a sequence of the OCC is any one of the following sequences: [1, 1, 1, 1, 1, 1, 1], $$\left[1, e^{j\frac{2\Pi}{7}}, e^{j\frac{4\Pi}{7}}, e^{j\frac{6\Pi}{7}}, e^{j\frac{8\Pi}{7}}, e^{j\frac{10\Pi}{7}}, e^{j\frac{12\Pi}{7}}\right],$$

$$\left[1, e^{j\frac{4\Pi}{7}}, e^{j\frac{8\Pi}{7}}, e^{j\frac{12\Pi}{7}}, e^{j\frac{2\Pi}{7}}, e^{j\frac{6\Pi}{7}}, e^{j\frac{10\Pi}{7}}\right],$$

$$\left[1, e^{j\frac{6\Pi}{7}}, e^{j\frac{12\Pi}{7}}, e^{j\frac{4\Pi}{7}}, e^{j\frac{10\Pi}{7}}, e^{j\frac{2\Pi}{7}}, e^{j\frac{8\Pi}{7}}\right],$$

$$\left[1, e^{j\frac{8\Pi}{7}}, e^{j\frac{2\Pi}{7}}, e^{j\frac{10\Pi}{7}}, e^{j\frac{4\Pi}{7}}, e^{j\frac{12\Pi}{7}}, e^{j\frac{6\Pi}{7}}\right],$$

$$\left[1, e^{j\frac{10\Pi}{7}}, e^{j\frac{6\Pi}{7}}, e^{j\frac{2\Pi}{7}}, e^{j\frac{12\Pi}{7}}, e^{j\frac{8\Pi}{7}}, e^{j\frac{4\Pi}{7}}\right], \text{ or}$$

$$\left[1, e^{j\frac{12\Pi}{7}}, e^{j\frac{10\Pi}{7}}, e^{j\frac{8\Pi}{7}}, e^{j\frac{6\Pi}{7}}, e^{j\frac{4\Pi}{7}}, e^{j\frac{2\Pi}{7}}\right].$$

17. The computer program product of claim 15, wherein a multiplexing multiple of the OCC is 6 or 7.

18. The computer program product of claim 15, wherein the quantity of symbols by the PUCCH is configured by the base station.

19. The computer program product of claim 15, wherein the OCC is a multiplexing multiple of a first time domain resource.

20. The computer program product of claim 19, wherein the computer-executable instructions further cause the electronic device to be configured to calculate the multiplexing multiple of the first time domain resource when a first duration PUCCH transmits with frequency hopping on the first time domain resource or when the first duration PUCCH transmits without frequency hopping on the first time domain resource.

* * * * *